United States Patent [19]
Curry

[11] Patent Number: 5,566,515
[45] Date of Patent: Oct. 22, 1996

[54] HIGHLY WIND RESISTANT PRE-ASSEMBLED RELOCATABLE BUILDING STRUCTURE WITH CONTINUOUS SHEET OUTER WALL

[76] Inventor: Paul F. Curry, Apartment J-54, 540 Park Blvd., Marion, Va. 24354

[21] Appl. No.: 540,453

[22] Filed: Oct. 10, 1995

Related U.S. Application Data

[63] Continuation-in-part of Ser. No. 998,673, Dec. 12, 1993.
[51] Int. Cl.[6] ......................................................... E04H 9/00
[52] U.S. Cl. .............................. 52/79.12; 52/94; 52/143; 52/746.1
[58] Field of Search .................................. 52/94, 96, 79.12, 52/267, 269, 746.1, 143, 79.1, 299, 293.3

[56] References Cited

U.S. PATENT DOCUMENTS

| | | | |
|---|---|---|---|
| 3,461,633 | 8/1969 | Ziegelman et al. | 52/79.9 X |
| 3,719,015 | 3/1973 | Misawa | 52/299 X |
| 3,795,336 | 3/1974 | Acker et al. | 52/143 X |
| 3,845,592 | 11/1974 | Patena | 52/293.3 X |
| 3,884,494 | 5/1975 | Ashby et al. | 52/143 X |
| 3,974,602 | 8/1976 | Pohl et al. | 52/143 X |
| 4,019,304 | 4/1977 | Timm | 52/746.1 |

*Primary Examiner*—Rodney M. Lindsey
*Attorney, Agent, or Firm*—Ronald P. Kananen

[57] ABSTRACT

In order to provide a pre-assembled, relocatable building structure which can be transported by road from one site to another, a metal skeleton which is formed of 6×2 inch rectangular cross-section hollow steel tubing, is welded together and provided with horizontally extending anchor brackets at the bottom of each vertically extending column member. These anchor pads allow the building to be lowered onto foundations in which anchor bolts are imbedded, and bolted in place. The foundations are formed so as to take the form of continuous elongate footers which break the passage of wind which tends to flow sideways under the housing structure. A shallow crawl space can formed between the foundation footers to facilitate service connections. To prevent winds from tearing off side and roof panels of roof and wall structures secured to the skeleton, metal brackets are used to enclose or encapsulate the edges of the panels in a manner which prevents the direct contact with the wind.

30 Claims, 18 Drawing Sheets

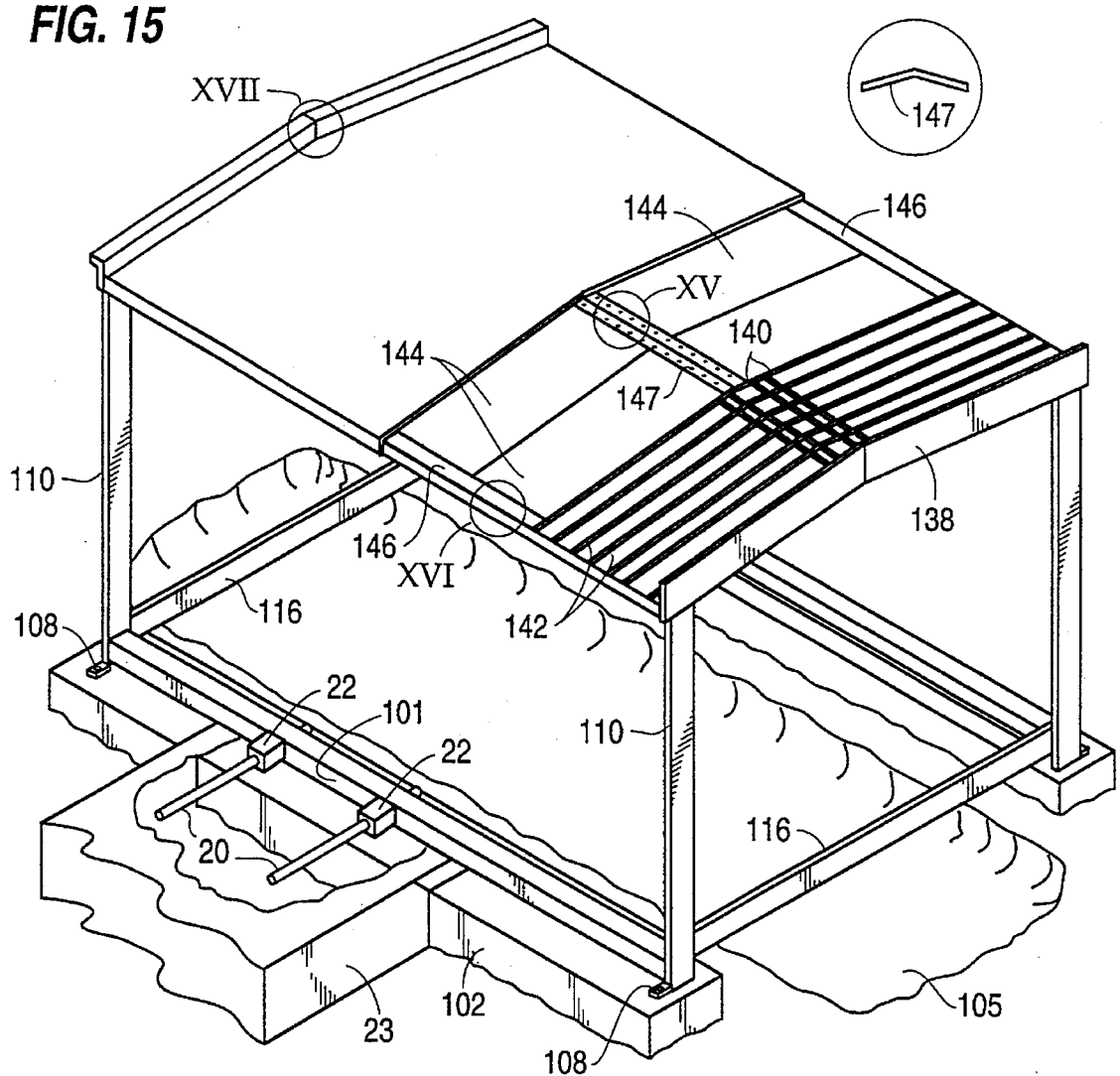

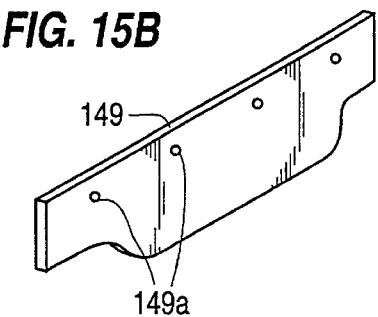
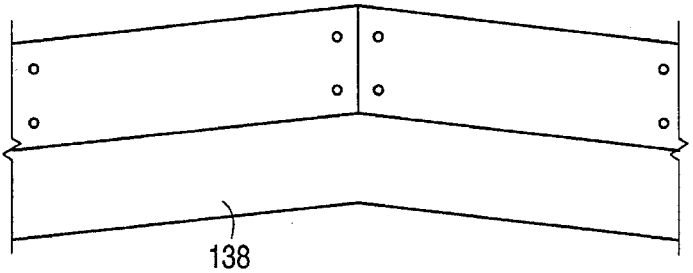
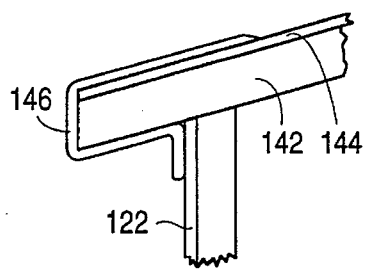
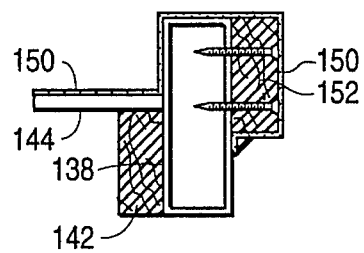
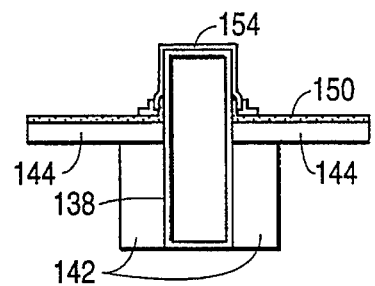

(SINGLE WIDE)

(DOUBLE WIDE)

(MORE THAN DOUBLE WIDE)

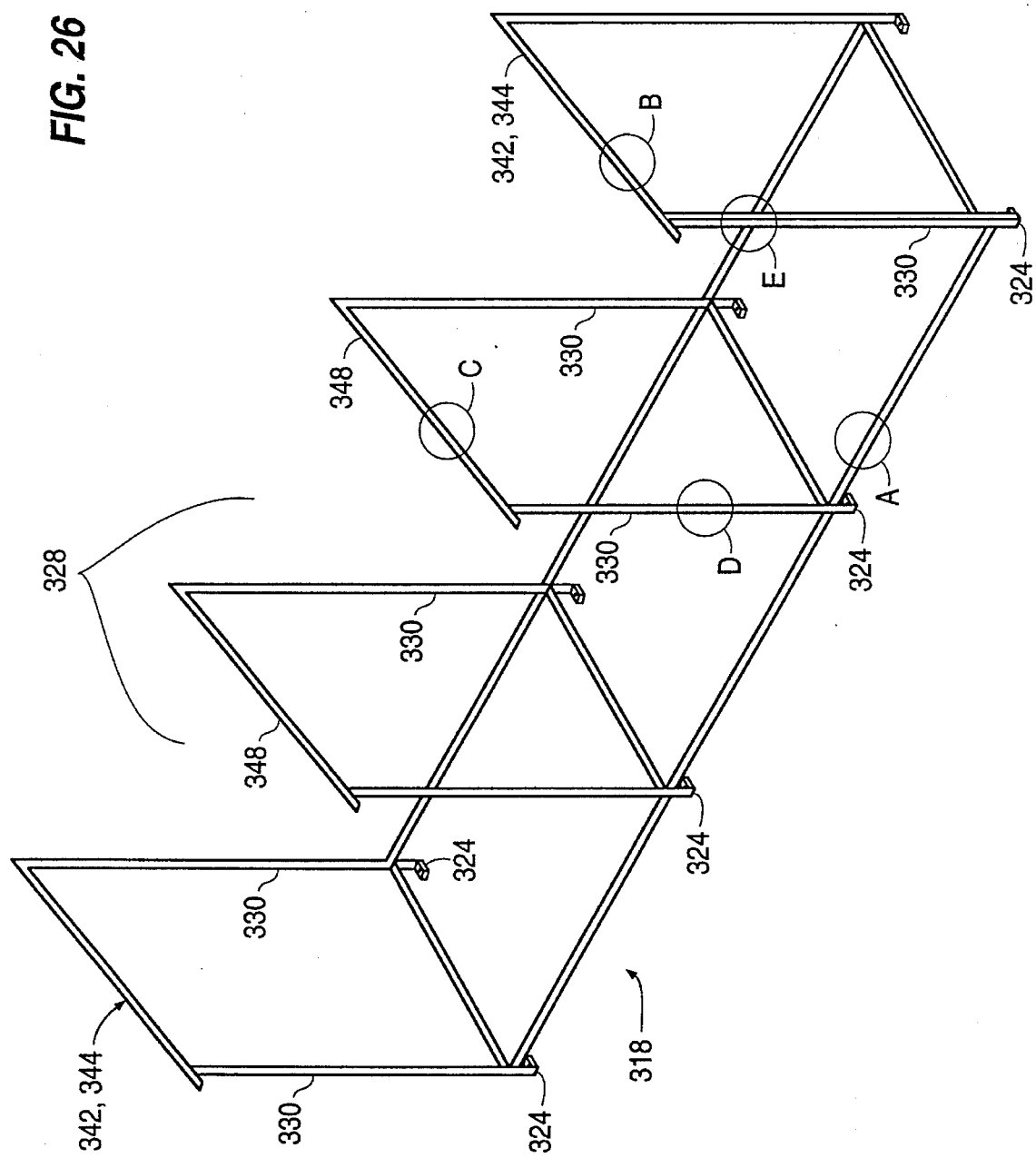

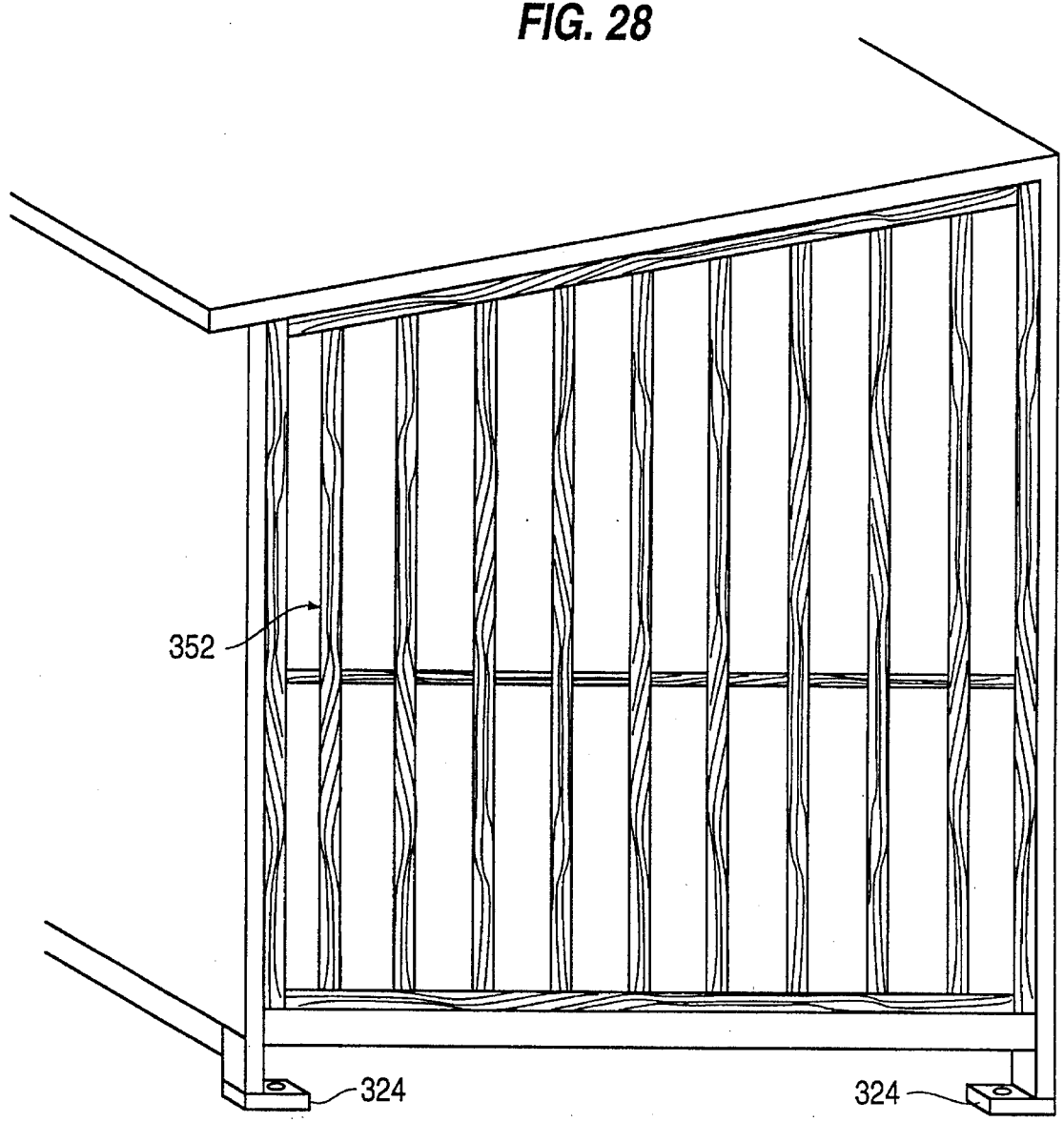

HIGHLY WIND RESISTANT PRE-ASSEMBLED RELOCATABLE BUILDING STRUCTURE WITH CONTINUOUS SHEET OUTER WALL

This is a continuation-in-part application of U.S. patent application Ser. No. 07/998,673, filed Dec. 12, 1993.

BACKGROUND OF THE INVENTION

1. Field of the Invention

The present invention relates generally to prefabricated housing structures and more specifically to a prefabricatable housing structure which exhibits a high resistance to high winds such as produced by hurricanes and the like and which also exhibits sufficient structural rigidity to permit the structure to be transported by road from one site to another. More particularly, this invention relates to such a structure with an outer wall made from a continuous metal sheet, such as aluminum having only one vertical seam.

2. Description of the Prior Art

Relatively low cost housing such as mobile homes which are set up in trailer parks and the like, or structures such as temporary/emergency accommodations, hospitals and the like which are erected at or near disaster sites have suffered from the drawbacks that very little thought apparently has been given to making the structures resistant to very high winds. By way of example, in the case of mobile homes (that is, transportable house structures which are sufficiently large that they can be used as homes), it is often the case that the structure is mounted on a channel steel chassis-like arrangement and is towed to a site by a prime mover and then left sitting on the wheeled bogeys which were used to road transport the unit and/or set on a number of concrete or brick columns. The ends of the structure are usually tied down using steel cables or the like.

However, under these circumstances, the house structure usually tends to be propped up 2 to 3 feet above the level of the ground on which it is supported and therefore is in a position which allows the relatively unrestricted passage of high velocity winds beneath the structure. This of course means that large upwardly acting forces can be produced by the winds acting on the underside of the housing structure. Such forces place a large strain on the ties which are intended to tether the structure to the ground. Should the force or gusting of the wind or both which frequently accompanies strong storms, such as hurricanes, gales, tornados, and the like, loosen or disconnect the tethering, the structure can then be lifted off its supports or turned over or both. In either event, significant structural damage is inevitable and places the safety of any occupants in great jeopardy.

Even in the case where the tethering remains intact, either or both of the roof and side walls are apt to be torn off by the wind catching beneath overhanging or terminal edge portions of panels or sheets which form part of either the roof or side walls or both.

In the latter case, it is usual that if one external side wall panel or member of the housing structure can be lifted up and/or removed by the action of the wind, that is, the pneumatic pressure which acts on the relatively large surface of the inner sides of the side panel and therefore produce a large force, the structure is rendered so susceptible to "pneumatic erosion" to the degree that a snowball effect results, and the whole building is apt to be torn apart or badly destroyed. Once the building structure is compromised by the removal of a single exterior panel, the inner structure, which is never intended to be exposed to external influences and which is definitely not designed to withstand high velocity air flows, is then exposed and usually removed or damaged by the pneumatic forces. Hence, once one part of the house is removed, the remaining structure is usually left unprotected for ready penetration by the high velocity winds. The structure is therefore at the mercy of the storm and progressively undergoes severe damage.

It is therefore considered that there is a unfulfilled need for an economical housing structure: (1) which is sufficiently large so that it can be used as a home; (2) which is highly resistant to high winds such as produced by powerful storms; (3) which can be prefabricated, which is sufficiently light that it can moved either as a whole unit or in connectable segments, by road transport, to a site where it will be put into use; (4) which can very quickly set and connected in place; and (5) which has a unitary exterior sheet of metallic material acting as a substantially seamless outer wall.

SUMMARY OF THE INVENTION

It is an object of the present invention to provide a housing structure which can be prefabricated and moved to a site where it will be occupied, and which is highly resistant to the effects of high velocity winds and the like.

It is another object of the present invention to provide a housing structure which can be assembled at one site and then readily road transported to another wherein it can be very quickly mounted on pre-prepared foundation members.

It is a further object of the present invention to provide a transportation arrangement which facilitates the road transportation of the housing structure both to and from the site wherein it is occupied and/or put into actual use.

It is yet another object of the present invention to adapt the framework of the housing structure so that placement on a dedicated transportation arrangement is facilitated and once in place, forces which are applied to the housing structure framework are generally compressive and thus attenuate any tendency for nails, screws and the like type of fastening elements to be pulled out of place under the influence of tensile forces.

One of the major features of the present invention resides in that the inventive structure is based on a tubular metal structure which is provided with a number of anchor pads which enable the structure to be bolted to a pair of parallel concrete foundation members in which anchor bolts are set.

In some embodiments, the metal tubing may be arranged to jut out from the surfaces of the building to define rib-like projections which extend up the sides of the building sides and across the building roof at spaced intervals. These ribs function to break wind which strikes thereagainst and form what can be considered to be air dams or pockets of relatively still air in regions where side edges of structural panels are located. This serves to reduce the wind velocity at these sites and attenuates the chances of panel lifting pneumatic forces being generated.

A further major feature comes in that essentially all of the terminal edges of panels which comprise the wall and roof structure are encapsulated by metal brackets. This seals off the openings into which high velocity winds can force their way and produce pneumatic forces which can pry the panels away from their intended positions.

Another feature of the invention comes in that the tubular metal structure allows a concrete patio or car park to be connected to the metallic tubular structure and thus add to the forces which tend to hold the building as a whole on its foundations and thus prevent the structure from being overturned.

Another feature of the invention comes in that the metal framework is bolted to foundations which are formed so as to continuously extend lengthwise along the sides of the building and thus greatly reduce the surface area which can be acted on by high velocity air flows in a manner which produces uprooting type forces.

A further feature of the invention comes in that, in the case of larger type structures, the building can be carried to a selected site in sections, placed on the foundations in very close proximity to each other and then drawn together in a manner which establishes a sealing connection therebetween, using bolts or the like type of fastening arrangements. In this instance, the anchor pads can be formed with suitably elongate holes which allow the individual structures to be placed on the foundations such that the anchor bolts pass therethrough while still allowing for the relative movement of the structures with respect to the foundations.

A first major aspect of the invention resides in a pre-assembled, relocatable building structure which can be transported in completed form and which can be set on foundation members, the building structure having a plurality of sides and a roof, comprising: a metallic skeleton including a plurality of pairs of vertically extending column members, longitudinally extending side beam members and laterally extending cross beam members, the side beam and cross beam members being permanently connected to the column members at a level proximate the lower end thereof, the skeleton further including a plurality of angled portions, each of the angled portions being permanently connected to the upper ends of a pair of the column members, the metallic skeleton including at least one cell space defined between adjacent pairs of column members; a prefabricated wooden housing unit having a floor, at least one wall and a roof, which is disposed in the cell space, the wooden housing structure being effective to fill the cell space and have members located in immediate proximity to each of four column members and which can be fastened to the column members, the wall forming a part of a side of the building structure; and a single sheet of material, such as an aluminum sheet which is wrapped about and fastened to the sides of the building structure, the single sheet continuously covering all sides of the building structure, and having first and second ends which overlap to form a single lone vertically extending seam.

Another aspect of the invention resides in that the above mentioned pre-assembled, relocatable building structure as set forth above, further comprises: a plurality of horizontally extending anchor pads which are each permanently secured to a bottom of a column member, each anchor pad being adapted for detachable connection to the foundation members, each of the anchor pads being formed with a hole through which a connection member which projects up from a foundation member can be passed.

Another aspect of the invention comes in that the above mentioned pre-assembled, relocatable building structure as set forth above, further comprises metal encapsulating bracket means associated with the wall and roof structures for enclosing edges of panels which form a part of the wooden housing unit thereof and for preventing direct contact of the edges with high velocity winds.

Another major aspect of the invention resides in a pre-assembled, relocatable building structure of the nature set forth above which is provided with: transporting means for supporting the building structure, the transport means including: a plurality of metal beams which can be disposed beneath the housing structure; a wheel carriage which can be detachably connected the rear ends of the metal beams; and connector means for connecting the forward ends of the metal beams to a prime mover.

A further major aspect of the invention resides in a pre-assembled, relocatable building structure which can be transported in a completed form and which can be set on pre-prepared foundation members, the building structure having a plurality of sides and a roof, comprising: a metallic skeleton including a plurality of pairs of vertically extending column members, longitudinally extending side beam members and laterally extending cross beam members, the side beam and cross beam members being permanently connected to the column members at a level proximate the lower end thereof, the skeleton further including a plurality of angled portions, each of the angled portions being permanently connected to the upper ends of a pair of the column members, the metallic skeleton including at least one cell space defined between adjacent pairs of column members; at least one prefabricated wooden housing unit having a floor, at least one wall and a roof, which is disposed in the cell space, each wooden housing structure being effective to fill a cell space and have members located in immediate proximity to each of four column members and which can be fastened to the column members, the wall forming a part of a side of the building structure; and means for securing the vertically extending column members of the metallic skeleton to the pre-prepared foundation members comprising a plurality of horizontally extending anchor pads which are each permanently secured to a bottom of a column member, each anchor pad being adapted for detachable connection to the pre-prepared foundation members, each of the anchor pads being formed with a hole through which a connection member which projects up from a pre-prepared foundation member can be passed.

An important aspect of the above described pre-assembled, relocatable building structure resides in the use of a single sheet of material such as a metal, for example, aluminum which is wrapped horizontally about and fastened to the sides of the building structure, the single sheet covering all sides of the building structure, and having first and second ends which overlap to form a single vertically extending seam.

Another major aspect of the present invention resides in a pre-assembled, relocatable building structure which can be transported in completed form and which can be set on foundation members, comprising: a roof; a wall; a single sheet of material having first and second ends, the sheet being wrapped about the house so as to completely cover the wall, the sheet being fastened to the wall, the first and second ends of the sheet overlapping to define a single joint where the sheet can be effected by pneumatic pressures generated by high velocity winds.

Another major aspect of the present invention resides in a method of constructing a house comprising the steps of: horizontally and continuously wrapping the walls of the house with a single sheet, such as a metal sheet, for example, aluminum; overlapping the ends of the sheet; fastening the overlapped ends at least to one another; and selectively cutting and folding in portions of the sheet into door and window openings.

Another aspect of the above-mentioned method lies in a method of constructing a house comprising the steps of: forming a metallic skeleton having a plurality of pairs of vertically extending column members, longitudinally extending side beam members and laterally extending cross beam members, the side beam and cross beam members being permanently connected to the column members at a level proximate the lower end thereof, the skeleton further including a plurality of angled portions, each of the angled portions being permanently connected to the upper ends of a pair of the column members, the metallic skeleton including a cell space defined between adjacent pairs of column members; forming a prefabricated wooden housing unit having a floor, at least one wall and a roof; disposing the prefabricated wooden housing unit in the cell space, the wooden housing structure being effective to fill the cell space and have members located in immediate proximity to each of four column members and which can be fastened to the column members, the wall forming a part of a side of the building structure; and welding brackets to the metallic skeleton to trap the at least one prefabricated wooden housing unit within the metallic skeleton.

Another important aspect of the above mentioned method relies in welding anchor pads, which enable the house to be detachably secured to pre-prepared foundations, to the lower ends of the column members.

Another important aspect of the method set forth above resides in: mounting wheeled bogeys on the anchor pads; and transporting the house along a predetermined path using the wheel bogeys.

Another very important feature of the above method resides in wrapping the walls of the house with a single sheet of material.

Important features of the above mentioned wrapping technique reside in supporting a roll of the sheet of material on a wheeled vehicle which can be moved around the house; paying out the sheet from the roll as the vehicle moves around the house; pressing the sheet against the walls of the house and fastening the sheet against the walls of the house; and cutting off the sheet and pressing the ends of the sheet which has been wrapped around the house on top of each other to form a seam.

BRIEF DESCRIPTION OF THE DRAWINGS

The various objects and attendant advantages of the present invention will become more clearly appreciated as the following description of the preferred embodiments of the invention is given with reference to the accompanying drawings in which:

FIG. 15 is a perspective view showing the manner in which the roof is constructed in accordance with the first embodiment of the present invention;

FIG. 15A is a cross-sectional view showing a V-shaped bracket member which is provided along the ridge or crest of the roof and which is enclosed in circle XV of FIG. 15;

FIG. 15B is a perspective view showing an example of an end plate which can be fastened to the ends of the metal framework to close off the ends of the building and prevent winds from freely blowing in under the house;

FIG. 16 is a sectional view showing the portion of the roof structure enclosed within circle XVI of FIG. 15;

FIG. 17 is an end elevational view showing the portion of the roof structure which is enclosed in circle XVII of FIG. 15 before the application of a membrane roof sheeting;

FIG. 18 is a sectional view showing the structure of an end portion of the roof which is enclosed in circle XVII of FIG. 1 after the membrane roof sheeting is applied and fastened down;

FIG. 19 is a sectional view similar to the one shown in FIG. 18 but which shows the completed roof structure at an intermediate roof portion;

FIG. 26 is a schematic view showing a metal skeletal structure which forms a vital part of a forth embodiment of the invention;

FIG. 28 is a perspective end view showing the structures shown in FIGS. 26 and 27 assembled and with an additional end wall member disposed in place;

DETAILED DESCRIPTION OF THE PREFERRED EMBODIMENTS

Figure 1:
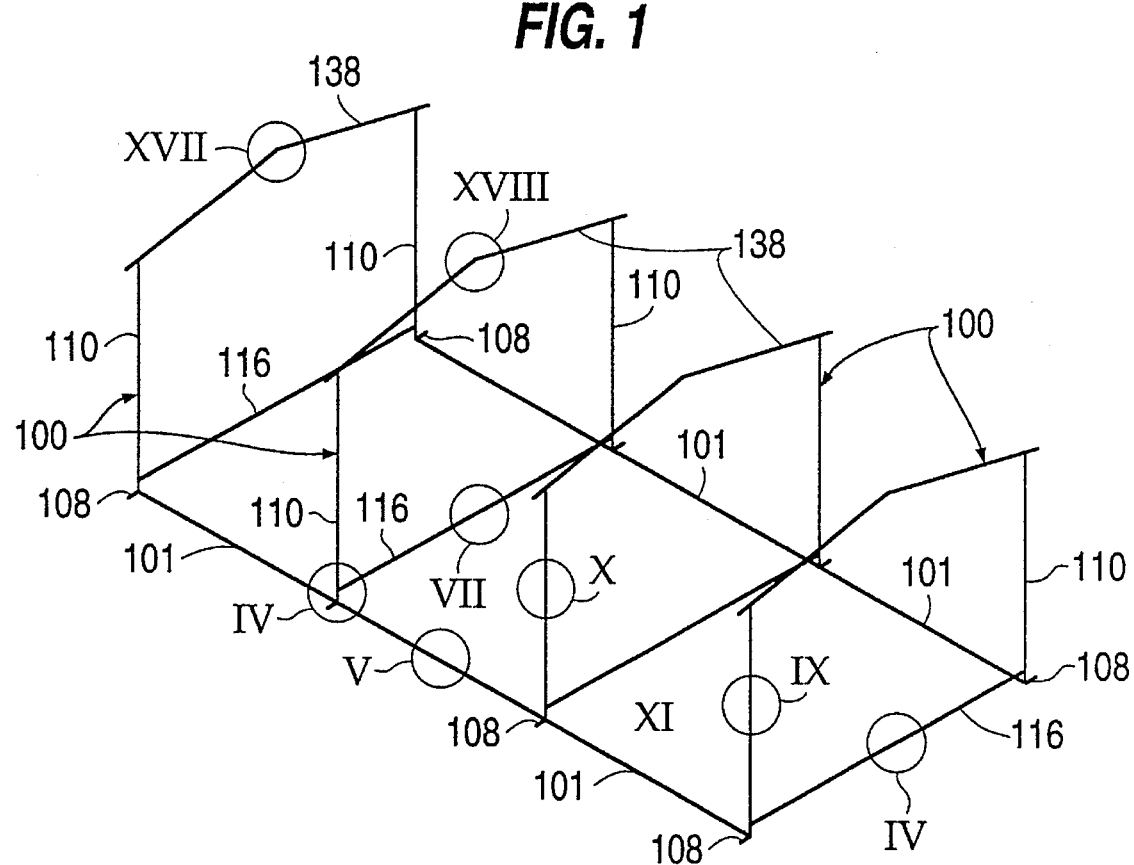
FIG. 1 is a perspective view which schematically illustrates the skeletal structure which is formed of tubular steel and which characterizes a first embodiment of the present invention.

FIG. 1 of the drawings schematically depicts a metallic tubular skeleton or framework which forms a vital part of the embodiments of the present invention. As will become more clearly appreciated as the detailed description of the embodiments develops, a number of vertical tubular steel frame arrangements, generally denoted by the numeral 100, are produced and then interconnected by longitudinally extending lower tubular steel side beam members 101. Following this, units which can be prefabricated from wooden and/or the like types of components/materials can be moved sideways into the cell-like spaces defined between the vertical tubular steel frame arrangements 100 and connections between the steel and the "cell units" can be made. These connections will be discussed in more detail later. After the connections between the wooden units and the steel frame are completed, the roof and side panels can be set in place and fastened in position.

While the invention is not limited to this procedure, it is envisaged at this time that this procedure would, in light of the current state of the prefabricated building art, be the most time economical approach to the completion of the building structure.

Figure 2:
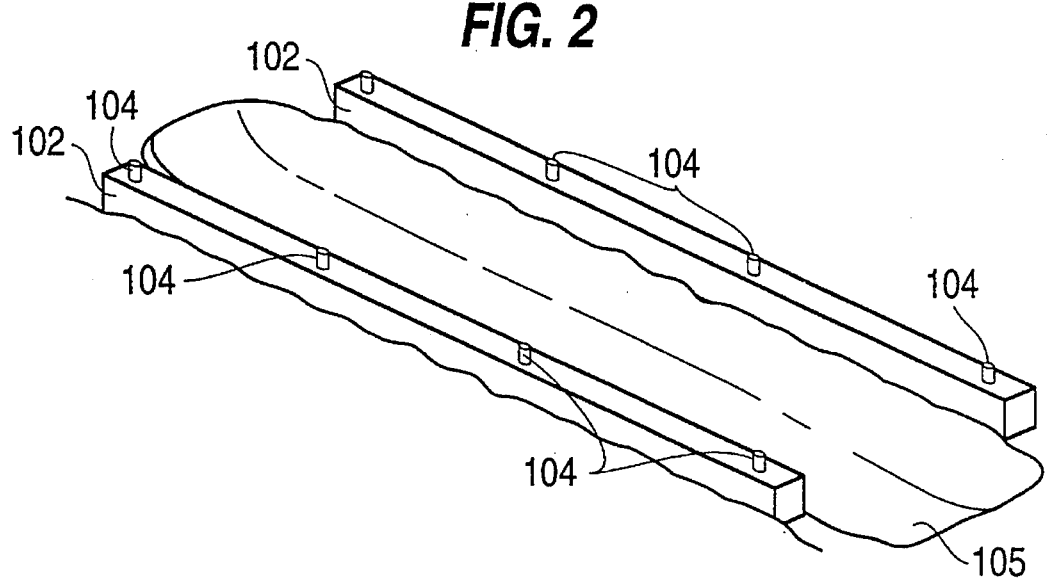
FIG. 2 is a perspective view showing an example of foundations on which the housing structure shown in FIG. 1 is adapted to be set, and the provision of a recess which defines a crawl space below the floor to enable water, electricity and the like type of services to be connected.
Figure 3:
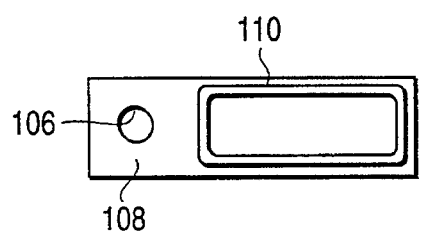
FIG. 3 is a plan view of an anchor pad which is used to connected the metallic tube framework shown in FIG. 1 to the foundations shown in FIG. 2.

In order to reduce the amount of time needed to set up the prefabricated housing structure, the foundation arrangement of the nature illustrated in FIG. 2 should be formed prior the arrival of the housing structure per se. As shown, the foundation arrangement includes two parallel steel re-enforced poured cement footers which are set in the earth. Each of the footers 102 has a predetermined number (four in this case) of vertically oriented bolts 104 set therein at predetermined spacings. A crawl space 105 is formed by removing some of the soil from between the two footers 102.

When the building structure is placed on the foundations, the bolts 104 which project up from the cement footers 102 pass through holes 106 formed in anchor pads 108 which are welded to the bottom of the vertical oriented "column" members 110. This allows nuts to be threaded onto the bolts 104 so that the structure is very quickly tightened down into place. Following this, connection of the electricity, water and the like type of services can be accomplished via the provision of the crawl space 105.

Figure 4:
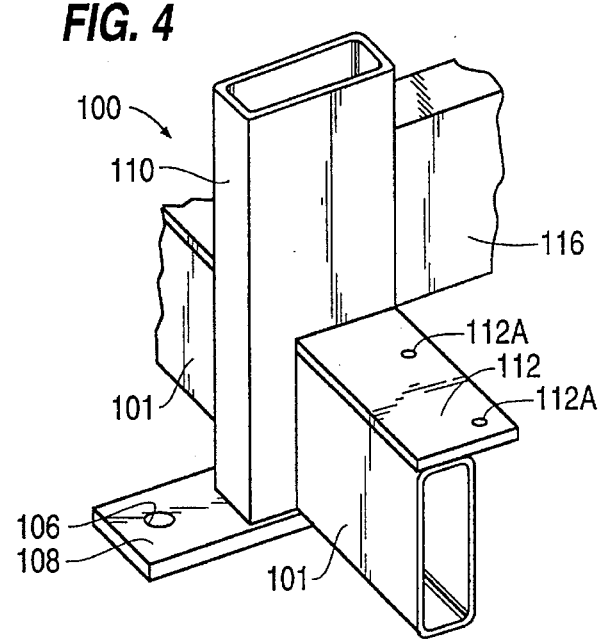
FIG. 4 is a perspective view showing the manner in which an anchor pad is connected with the metallic tube framework and other features of a portion of the latter such as exist at the junction enclosed in circle IV of FIG. 1.
Figure 6:
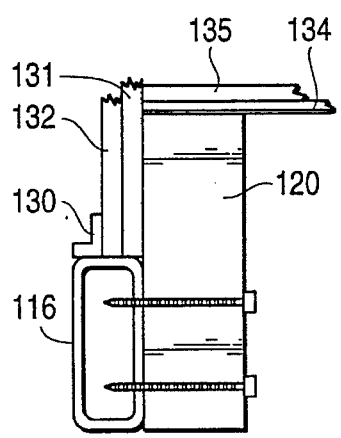
FIG. 6 is a side sectional elevation of a lower laterally extending frame portion such as enclosed in circle VI of FIG. 1 and which shows the manner in which end wall structure is arranged therewith.

This first embodiment is such that the metal tubular structure is formed almost entirely of 2×6 inch rectangular cross-section hollow tubular steel. As shown in FIG. 4, the anchor pads 108 are welded to the bottom of the vertically oriented columns 110, so that they project laterally outward from the structure. The column 110 depicted in FIG. 4 forms part of one of the intermediate tubular steel frame arrangements, and therefore has a side beam 101 which is welded to each of the major (6 inch) sides thereof. In this instance, the side beams 101 are connected to the middle of the column 110 so that approximately a two inch clearance exists on either side. A 4×¼ inch metal plate 112 is welded to the top of each of the side beams in the manner depicted in this figure. It is preferable (but not essential) that the inboard edge of the metal plates 112 terminates at a level which is flush with the inner edge of the vertical columns 110.

Figure 11:
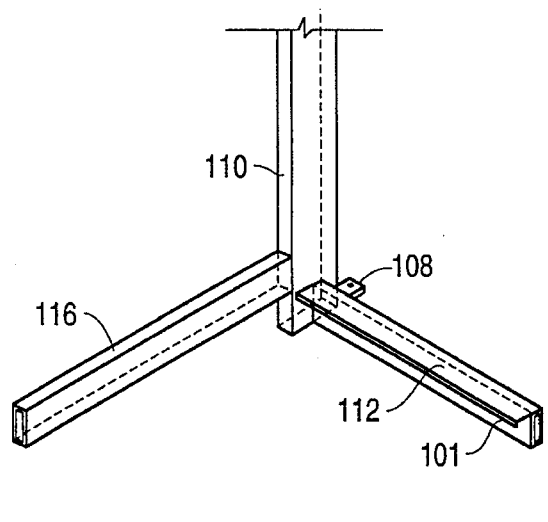
FIGS. 11 and 12 are perspective views showing the arrangement of a corner of the framework as seen from within the same, and which show the framework with and without the wooden header and floor joists which form part of the completed structure.
Figure 12:
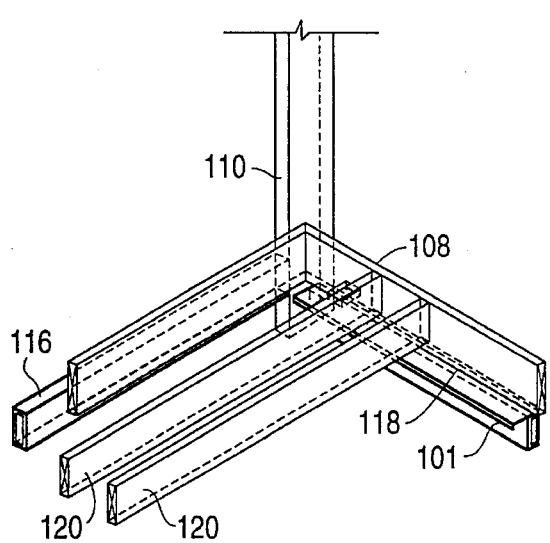
Figure 13:
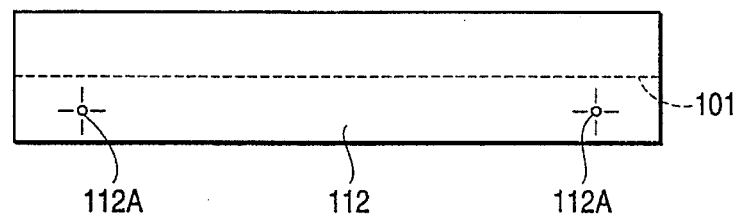
FIGS. 13 and 14 are plan views showing the arrangement of a metal plate which is welded to the top of one of the lower tubular side frame member and the manner in which header and floor joists are disposed therewith.
Figure 14:
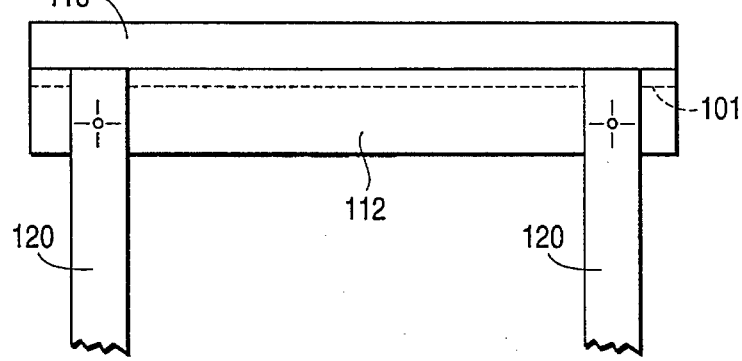

Spanning or cross beams 116 which are formed of 2×6 inch rectangular cross-section steel tubing, are welded to the inner edges of the vertical column in the manner apparent from FIGS. 4 and 11. As will be appreciated from these figures, the cross beams 116 are arranged at a level which is higher than the side beams 101.

The purpose of the 4×¼ inch plates 112 is to support headers 118 and the ends of the floor joists 120. The arrangement of these elements which is used in the first embodiment is shown in FIGS. 5, 12, 13 and 14. As will be appreciated from these views, the metal plates 112 are formed with a number of through holes 112A, through which suitable screws are screwed into the lower surfaces of the floor joists 120.

The lower ends of the side wall sheets 122 are nailed to the sides of the headers which in this instance are made of 10×4 inch pieces of lumber.

Figure 5:
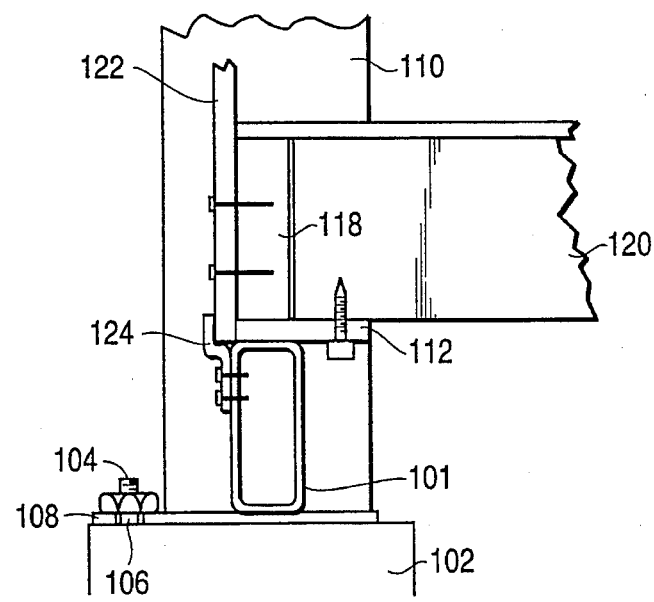
FIG. 5 is a side sectional elevation of a lower longitudinal extending frame portion such as enclosed in circle V of FIG. 1 and which shows the manner in which wooden headers, floor joists, floor sheeting and outer wall panel are arranged therewith.
Figure 9:
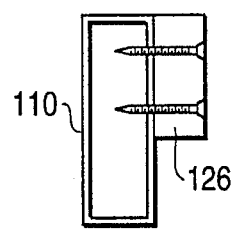
FIGS. 9 and 10 are sectional views of the portions of the framework enclosed in circles IX and X of FIG. 1.
Figure 10:
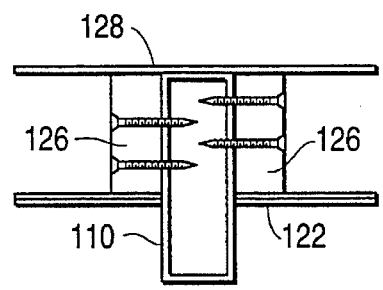

In order to facilitate construction and to encapsulate or enclose the lower edges of the side wall sheets, elongate side wall bracket members 124 are attached to the sides of the side beams 101 in the manner illustrated in FIG. 5. These brackets 124 can be screwed in place or welded or both as meets the situation. These side wall brackets 124 are such that the side wall sheets 122 can be inserted into the channel defined between the brackets 124 and the side beams 101 and then pushed into the desired flat position while nails or the like type of fasteners are driven therethrough into the headers 118 and other wooden elements such as studs 126 or the like which are used to construct the side walls of the building. The studs 126 are, as shown in FIGS. 9 and 10, screwed into position against the sides of the vertical columns 110. It will be noted that FIG. 9 depicts the situation which occurs at the ends of the building while FIG. 10 depicts the arrangement which occurs at the intermediate columns. In FIG. 10, an inner wall sheet 128 (½ inch dry wall sheet) is shown disposed against the studs 126 and in a manner which conceals the inner edges of the vertical columns 110.

In order to encapsulate the lower edges of the end wall sheets, an L-shaped bracket 130 is welded to the upper outer edge of each of the end cross beams 116 so as to define a channel between the end floor joist 120 and itself and thus provide a space into which the end wall sheets 131 and 132 can be inserted.

It should be understood that the above-mentioned encapsulation or enclosure of the lower ends of the sheets, which form part of the end and side walls, is such as to deflect strong winds to prevent the same from catching against the edges of the sheets in a manner which may lead to the same being pried loose by pneumatically generated forces.

Figure 8:
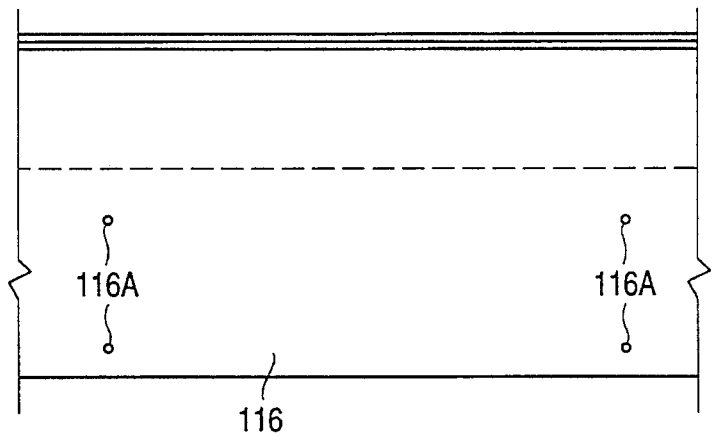
FIGS. 7 and 8 are side elevation and side sectional views of a portion of structure as enclosed in circle VII of FIG. 1.
Figure 7:
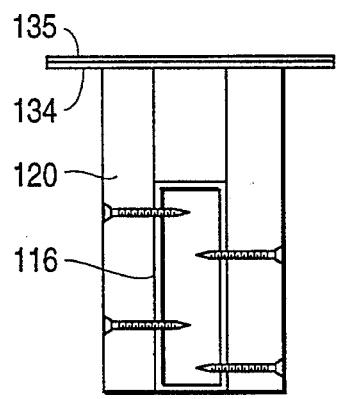

FIG. 7 depicts the manner in which the floor joists 120 are secured to the sides of the cross beams 116 by means of screws and how a floor sheeting 134 and floor covering 135 are laid over the tops of the joists. FIG. 8 is a elevation which shows the provision of drill holes 116a which formed in the cross beams 116 for receiving the screws shown in FIG. 7.

FIG. 15 is a staged cut-away perspective view showing the features of the roof construction which characterizes the first embodiment of the invention. In this drawing, most of the wooden structure is omitted so that a better understanding of the provision of the crawl space 105 and the disposition of the metal frame on the concrete footers 102.

FIG. 15B shows an example of an end plate 149 which can be attached to the cross beams 116 in a manner which closes off the ends of the buildings and further prevents the passage of high velocity winds under the structure after it is secured to the concrete footers 102. These end plates 149 are the last panel to be connected to the building and are put in place only after all of the necessary service connections such as electricity, water, and so forth, have been made.

As will be appreciated from FIG. 1, the roof structure is basically provided by two pieces of rectangular cross-section tubing which have been appropriate cut and welded together to define the angled roof sections 138. The ends of these angled roof sections or metal trusses 138 are welded to the tops of the vertically-oriented columns 110 so as to leave a suitable amount of eave defining overhang.

The roof structure in this case features the use of double lock-out braces 140 between the trusses 142 on either side of the ridge. A ½ inch roof ,sheeting 144 is secured to the top edges of the trusses 142. In accordance with a major feature of the present invention, the eave edges of the trusses 142 and roof sheeting 144 are clamped together by a elongate metal bracket 146. This bracket 146 encapsulates the edges of the roof sheeting 144 in a manner which protects the edges from exposure to pneumatically generated forces which would tend to tear them off in a powerful storm. As best seen in FIG. 16, the bracket 146 extends over the top of the roof sheeting 144 and also extends down over the upper edge portion of the side walls sheeting 122. This latter feature ensures that winds are deflected and are thus unable to force their way between the tops of the sheeting of the side walls and the underside of the roof structure. This of course provides considerable wind resistance to the final housing structure.

An elongate bracket 147 having a cross-section of the nature shown in FIG. 15A is used to secure the upper edges of the roof sheets 144. This bracket is fitted snugly in place on the wooden roofing sheeting and then welded to the metal trusses 138. This serves to hold the wooden structure, which is largely omitted from FIG. 15 for the sake of illustration, within the metal framework and defines one of the steps which integrates the exterior metal and the interior wooden and dry wall structures into an extremely strong and rigid unit. This arrangement is such as to provide to the finished product strength which enables transportation to be carried out without fear of damaging the structure and also to add to the wind resistance of the building. That is to say, this bracket 147 further advances the encapsulation which prevents the effects of strong winds from having a detrimental effect on the housing structure, and also endows rigidity to the roof structure and renders the same resistant particularly to compressive forces which tend to be generated during transit.

In the instant embodiment, a layer of elastomeric type membrane roofing material 150 is laid over the tops of the roof sheets 144. This sheeting is preferably obtained in a pre-cut size so that the width of the sheet is a little wider than the distance defined between the angled roof sections 138. This enables the membrane sheets to be drawn over the roof structure so as to completely cover the section of roof defined between each of the rib-like projections which are defined by the upper portions of the angled roof sections 138 which extend up above the general level of the roof. In the case of the two end angled roof sections 138, the membrane roofing material is wrapped up and over the top of the rectangular cross section tubing from which the angled roof section is formed, and then down over pieces of timber 152 which are fastened to the outboard faces of the tubing. The free edge of the membrane roof sheeting 150 is then clamped against the underside of the timber pieces 152 in the manner shown in FIG. 18.

In the case of the intermediate angled roof sections, the free edges of the membrane roof sheets 150 on either side of the metal tubing are arranged to extend up partially on either side of the tubing and are enclosed by an elongate sheet metal bracket 154. The free edges of the bracket 154 are then clamped down on the roof so as to securely retain the membrane roof sheeting in place.

It will be noted that in the instant embodiment, the membrane roof material is selected of the type which shrinks upon exposure to predetermined conditions such as an elevated temperature. This facilitates construction in that the membrane roof can be loosely set in place, folded and clamped, and so forth, and then allowed (or purposely induced) to shrink to a snug fit after the housing structure is completed.

Examples of roofing material/systems which can be used with the instant embodiment include those manufactured by Goodyear and which are commercially available under the trade or brand names of Versigard MD, Versigard HP7 and Hysunite.

It will of course be understood that the present invention is not limited to the use of the above membrane type roofing materials and that the use of a variety of different roofing material techniques can be envisaged.

Figure 20:
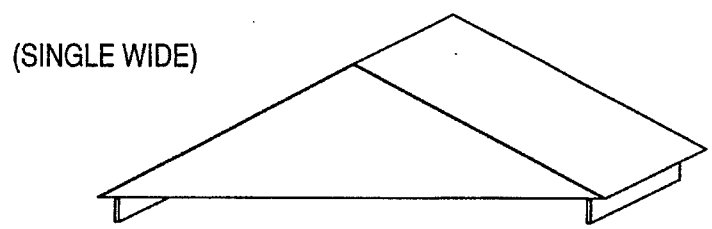
FIGS. 20, 21 and 22 respectively depict various roof widths which can characterize first second and third embodiments of the present invention and the manner in which the latter two can be moved together.

The present invention is not limited to completed units and in the case of larger structures can involve the prefabrication and transportation of a number of units which can be placed on foundations and then secured together. For example, if it is desired to set up a hospital or hotel like structure very rapidly, it is within the purview of the present invention, instead of constructing a single wide roof of the nature shown in FIG. 20, to make the structure in two halves, each having a double wide type roof configuration in the manner illustrated in FIG. 21. In other words, two units which are arranged to be placed on the foundations in very close proximity to each other, and then slide the two halves in the direction of the arrows until they contact one another.

Figure 22:
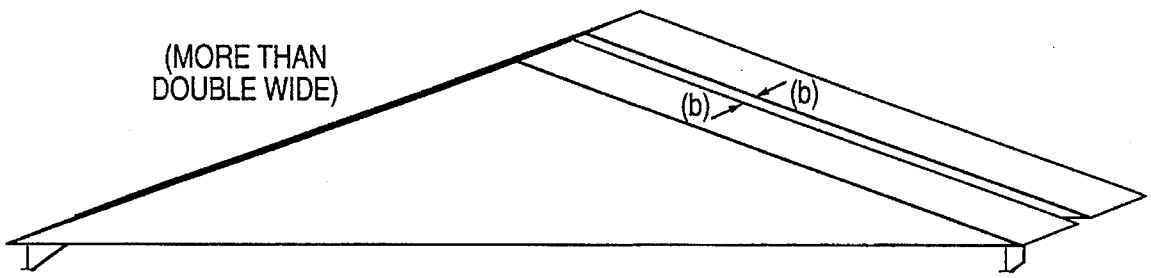

A third possibility comes in forming units which have a roof arrangement more than two wide and aligning these in a row in the manner depicted in FIG. 22.

Figure 21:
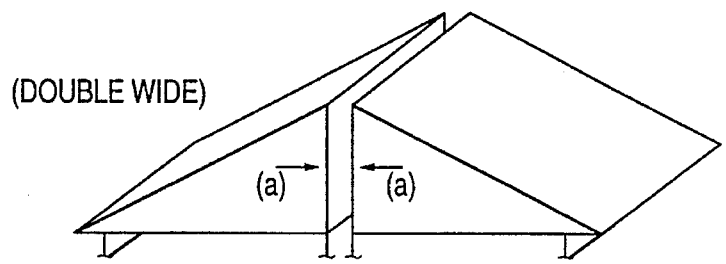

In the case of the arrangement depicted in FIG. 21, the anchor pads will need to be formed with apertures which are elongate in the wide or lateral direction of the housing structure. In the case of the larger structure shown in FIG. 22, the anchor pads will require apertures which are elongate in the length or longitudinal direction of the completed structure. As will be readily understood, the aperture elongation is necessary to allow relative movement between the units.

At this point, it is worth mentioning that the apertures formed in the anchor pads can be oversized to allow for minor incorrect positioning of the anchor bolts in the foundations. Washer like elements can be placed over the anchor pad in the instant that the apertures approach or exceed the size of the holes through which the anchor bolts project.

Figure 23A:
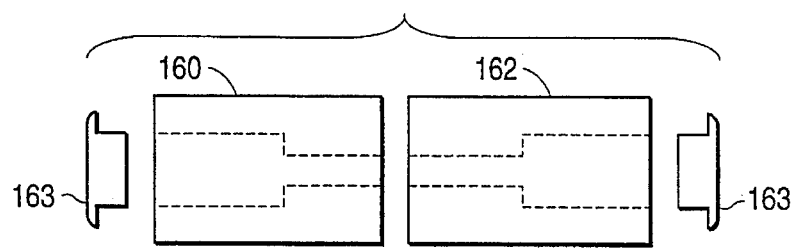
FIGS. 23A, 23B and 23C are side and end views showing the arrangement of a connector which can be used to fasten individual units according to the second and third embodiments of the present invention, together.
Figure 23B:
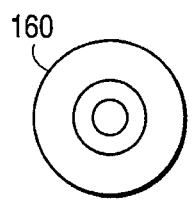
Figure 23C:
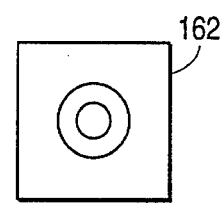

In order to facilitate the moving of the units into snug engagement with one another, the present invention contemplates the use of a number of devices which shall be referred to as "traction connectors". An example of such a device is illustrated in FIGS. 23A, 23B and 23C. These arrangements comprise metal plug components 160, 162 which can be welded into suitable apertures formed in the tubular steel which forms the basic skeleton of the housing structure(s). These components are set so as to face one another when the individual units are placed adjacent one another. One or both of the pairs can be formed by boring a stepped bore in rectangular cross-section stock. Alternatively, both can formed from circular cross-section stock. Plastic caps 163 can be provided to close and conceal the ends of the components when assembly of the housing structure is completed. A suitable bolt can be inserted into one of the elements so as to project into the one opposite the same. By tightening a nut on the bolt, a force which tends to drawn the two units together into snug engagement can be produced.

Before fastening the individual units together using a number of the above devices, suitable plastic sheeting, elongate elastomeric grommet-like seal elements, silicon sealant or the like (or a combination of the same if desired) can be set in place to seal the interface defined between the units and prevent the entrance of rain water and the like.

A further feature of the invention comes in that a patio or car park can be formed of reinforced concrete or the like in a suitable location immediately adjacent the house structure and connected to the metallic framework which forms a vital part thereof. In order to make this connection, two or more holes can be drilled through one (or more depending on the length of the patio or car park) of the side beams 101 and long bolts 20 (such as used in mine constructions) disposed therethrough so as to project as shown in FIG. 15 into the site where the patio is to be formed. Wooden blocks 22 are drilled and fitted onto the bolts and moved to locations proximate the outboard surfaces of the side beam in question. After this, the patio can be formed by pouring concrete into a mould which is filled with re-enforcing metal members and over the extending bolts which are arranged to project suitably into the mould.

Once the concrete has set, the patio and the house are rigidly connected by the elongate bolts.

When and if the house is required to be moved, all that is required to disconnect the housing structure and the concrete patio slab is to chip the concrete away sufficiently to expose the wooden blocks 22, and then split the blocks and lever out the broken pieces of wood using a crowbar or the like. This of course leaves holes in the concrete and exposes portions of each of the connection bolts. This facilitates the cutting of the bolts 20 via the use of a cutting torch or mechanical cutting device (e.g. bolt cutters or the like). As the bolts are cut very close to the side beam member through which they project, they can be pulled out of the side beams and thus allow the housing structure to be disconnected from the patio slab. Following this, the nuts which are threaded onto the anchor bolts 104 can be removed, thus leaving the housing structure free to be lifted up off the foundations 102 and transported away.

It is worth noting that in the case of a car park, ring connection means can be embedded in the concrete slab to enable rings to be screwed into place and used with suitable wire rope or the like to tie a vehicle down in preparation for a heavy storm. Viz., as will be appreciated, a vehicle such as a car, if simply left beside the house is apt to lifted by the strong winds and moved in a manner wherein it can be damaged or become a potential danger to the house per se.

Figure 24A:
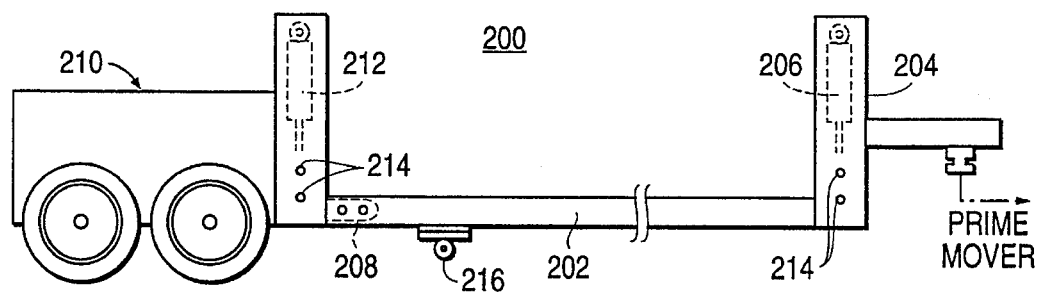
FIGS. 24A and 24B are schematic elevational views showing a transport arrangement which can be used to move the housing structures, in coupled and uncoupled conditions, respectively.
Figure 24B:
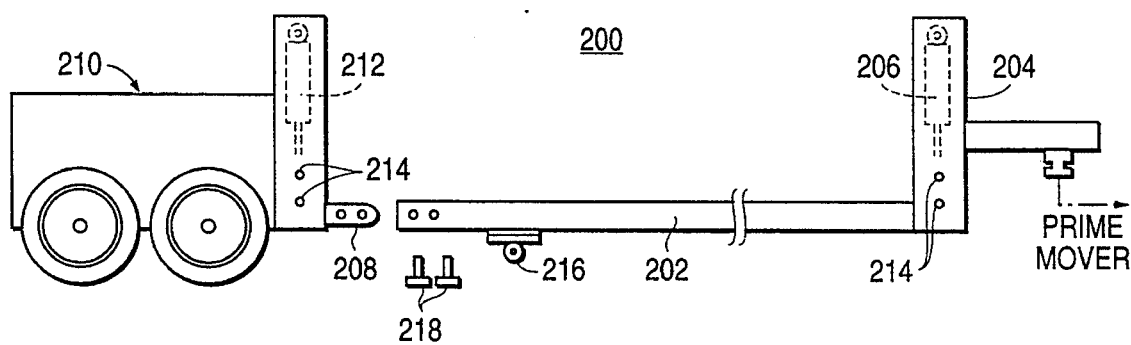

FIGS. 24A and 24B show a transport arrangement 200 which is used to transport the various housing structure embodiments of the instant invention. This arrangement includes a plurality of highly rigid steel beams 202 which are selected to possess sufficient strength to support the weight of a housing structure which is loaded thereon. The forward ends of the beams are connected to a forward servo arrangement 204 which is adapted to be connected to the rear of a prime mover. This arrangement includes a hydraulic cylinder or cylinders 206 which enable the forward ends of the beams to be selectively raised and lowered or maintained in a selected position.

The rear ends of the beams are adapted to receive tongue-like members 208 which are provided on a rear wheeled carriage 210. This rear carriage 210 is also provided with a hydraulic cylinder or cylinders 212 which enable the rear ends of the beams to be selectively raised or lowered and/or maintained in a selected position.

Side frame members which are associated with the hydraulic cylinders 206 and 212 are provided with locking pin holes 214 into which locking pins (not shown) can be inserted. These pins permit the horizontal beams 202 to be locked in place so that irrespective of any accidental loss of hydraulic pressure, the beams 202 will safely remain pinned in place.

In order to load and unload the housing structure, the beams 202 can be disconnected from the rear wheeled carriage 210 via the removal of safety locking pins. For example, during loading, the rear carriage 210 can be disconnected via the removal of the pins and rollers 216 which are supported by roller support brackets fixed to the lower surfaces of selected beams, after the leading ends of the beams have been suitably lowered via use of the forward hydraulic cylinder arrangements 206, 212, used to allow the prime mover to back up and push the beams 202 under the housing structure (which would be supported on supports essentially similar to the foundations shown in FIG. 2). After the beams 202 are passed under the structure to be transported, the rear carriage can be moved into place, and the tongues 208 pinned in position in the ends of the associated beams. After this, the forward and rearward hydraulic cylinders 206 212 can be used to lift the beams 202 up into contact with the lower side of the housing structure and then to a height sufficient to allow the structure to be moved clear of the supporting foundation arrangement. The beams 202 may be maintained at this height or lowered to one suitable for road transportation once the housing structure is moved clear of the supporting arrangement. Prior to moving onto a road, the beams are securely locked in place via the insertion of safety locking pins 218.

The rear wheeled carriage 210 is preferably of a width which can pass between the foundation footers 102 and allow the prime mover to be driven to a position wherein the housing structure is located directly above the foundation footers 102. Of course, the hydraulic cylinders may need to be activated to elevate the beams to a suitable height before the housing structure is moved into position above the foundations. After the appropriate location of the housing structure is achieved, the beams can be lowered to allow the housing structure to settle onto the foundation footers 102 in a manner wherein the anchor bolts 104 pass up through the apertures in the anchor pads 108.

Removal of the housing structure from the foundations is basically as easy as the initial setting procedure.

In the event that it is required to set the above type of structures over a pre-prepared basement (the walls of which would basically become the foundations for the prefabricated housing structure), the above-mentioned rollers can be utilized to allow either the prime mover to back-up and push the structure into position (note that a number of sets of rollers may be necessary as the rear ends of the beams project out over the void created by the basement). Alternatively, a forklift type of vehicle or "mantis-mule" as it will be referred to, can be adapted to support the rear ends of the beams and be used to draw the same into position.

In the event that it is preferred to be able to remove the "mantis-mule" from the basement, some provision for doing the same must be provided. For example, the mule can be constructed in a modular form which can be disassembled and rolled out of a basement entrance. Alternatively, a ramp can be formed which allows the unit to be driven out of the basement. This ramp can then serve as the site for a basement entrance. The various other possibilities will be apparent to those skilled in the art to which the present invention pertains and, as such, no further disclosure is deemed necessary. As an alternative to the use of the elongate beams 202, it is within the scope of the present invention to provide the forward servo arrangement 204 with tongues similar to the tongues 208 provided on the rear wheeled carriage 210 and to insert the fore and aft pairs of tongues into the ends of the side beams 202 and to thereafter pin the tongues in position. This technique therefore eliminates the need for the beams 202 and makes use of the building structure per se as part of the transport arrangement used to move the prefabricated structure from one place to another.

Although the above-disclosed embodiment has been described as having the angled roof sections 138 projecting above the roof level, it is within the scope of the present invention that the roof be constructed in such a way that the wooden trusses 142 are recessed below the tops of the tubing which define the angled roof sections 138, by an amount such as ½ to ⅝ inches, and that the roof sheeting 144 be selected to have a thickness such that the tops of the sheets 144 and the metal trusses 138 are flush with one another. This enables the membrane roofing to be laid over the roof in a single sheet and thus eliminates the formation of any seams therein.

Figure 25A:
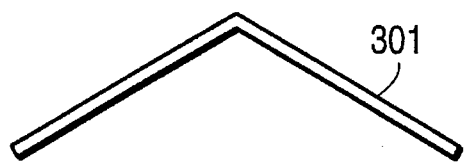
FIGS. 25A, 25B, 25C and 25D are cross-sectional view of various bracket members which can be used with the embodiments of the invention in order to endow strength and wind resistance.
Figure 25B:
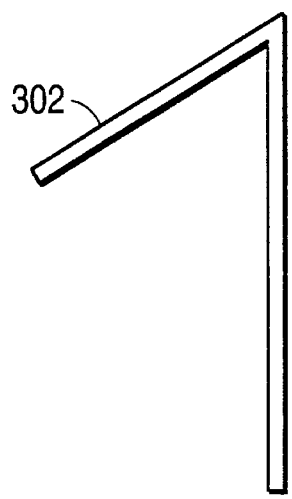
Figure 25C:
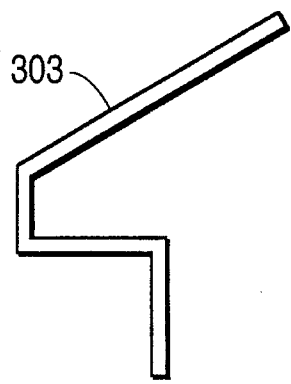
Figure 25D:
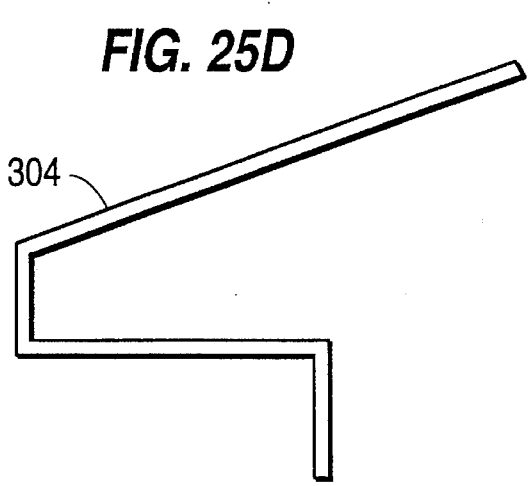

FIGS. 25A to 25D show the profiles of various brackets which can be used with the embodiments of the present invention. The first of these brackets 301 is the same as bracket 147 used in FIG. 15. The bracket 302 shown in FIG. 25B is suited for use on the type of structure illustrated in FIG. 30. The brackets 303, 304 shown in FIGS. 25C and 25D are used as eave caps and are used along the sides of the roof structure. All of these brackets are arranged to be placed over the wooden structures and then welded to exposed portions of a metal frame. These brackets therefore function both to add rigidity and strength to the building structure and to prevent high speed winds from getting under the panels which form the roof and or walls of the building and prevent the generation of pneumatic forces which can tear the panels away from the building.

Figure 29A:
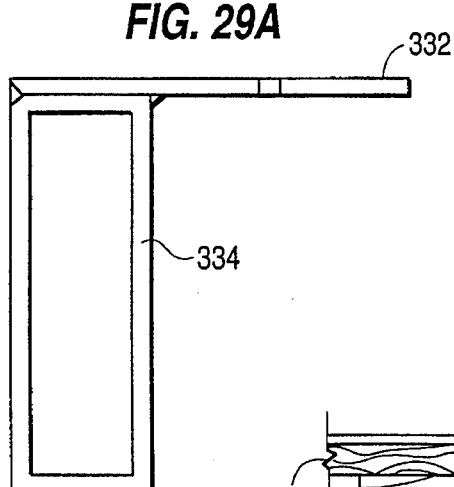
FIGS. 29A, 29B, 29C, 29D and 29E are sectional views which are respectively taken at locations indicated by circles A, B, C, D and E shown in FIG. 26 of the building prior to horizontally wrapping of the walls with a single sheet of material.

FIGS. 26 to 29E show structures which are used in accordance with a fourth embodiment of the invention. FIG. 30 shows a partially completed building structure 310 which is constructed in accordance with this fourth embodiment.

The fourth embodiment features a unique wall structure wherein a sheet 312 of metal or suitable material, is wrapped horizontally about the building structure in a manner to completely and continuously cover the walls of the building. It is within the scope of the present invention to apply an adhesive to the walls which are being wrapped during the wrapping process so as to retain the sheet in place. The sheet, after being wrapped, is then additionally fastened by screws to the surfaces of the wooden panels over which the sheet is laid. Window and door openings such as those denoted by 313, 314 are preformed in the wooden structure and the sheet, after being disposed in place, is punctured, cut and folded back into the openings. Window frames and door jambs (not shown) are then disposed in the openings and secured in place. By carefully wrapping the house, it is possible to arrange for the seam 316 which is defined by the two ends of the sheet to overlap at the door opening in a manner such as illustrated in FIG. 30. With this arrangement, when the sheet is cut and folded back into the door aperture, the length of the remaining seam which is exposed to external winds is reduced in length to inches. Brackets 302, 304 such as those shown in FIGS. 25B or 25D for example, are mounted on the edges of the roof structure so as to overlay the upper edge of the wrapped sheet and are welded to a metal frame 318 such as shown in FIG. 26. The provision of the brackets 302, 304 of course seals off the upper side edges of the sheet 312 and thus seals off this area from the wind. Side wall brackets 320 are then placed along the lower edges of the building and welded to the metal frame 318. The ends of the building provided with brackets 322 which are placed over the upper edges of the sheet 312 (denoted by one dot phantom) and welded to the metal frame 318. In this embodiment, the bracket 302 which is provided on the other side of the building extends sufficiently down the side of the building to cover the upper edge of the sheet 312 on that side of the building 310.

This unique wall structure is therefore almost entirely free of seams and openings into which, wind can penetrate in a manner which can result in structural damage.

The metal frame 318 which forms the skeleton of the building 310 is shown in FIG. 26. This structure is similar to that shown in FIG. 1; however, it differs in that it features a lean-to type roof configuration with an eave on one side of the building only.

One notable difference between the frame shown in FIG. 1 and that shown in FIG. 26 is that the anchor pads 324 are oriented inwardly instead of outwardly. The reason for this will become more apparent as a discussion of the fifth embodiment relating to a production line technique is made hereinlater with reference to FIGS. 31 to 36. This inwardly oriented anchor pad arrangement is also more aesthetically pleasing.

Figure 27:
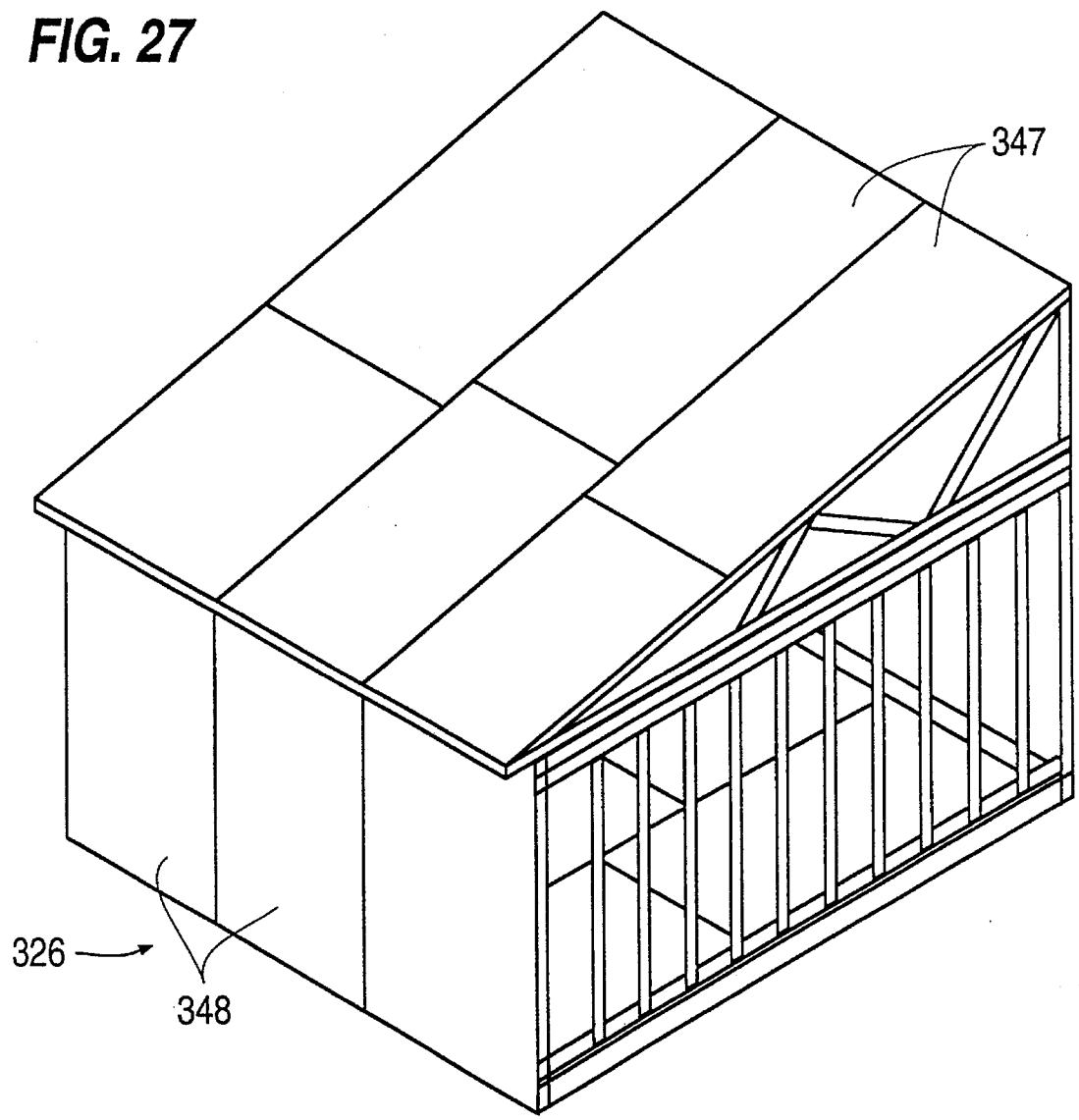
FIG. 27 shows an example of a wooden structure which is completed outside of the metal frame and which is inserted into the cells defined by the metal frame.

FIG. 27 shows an example of prefabricated wooden structure units 326 which can be slid into the cells 328 defined between the vertically oriented column members 330. These units are connected with or supported by the metal frame 326 in the manner illustrated in FIGS. 29A to 29D. The structure shown in FIG. 29A is essentially identical to that shown in FIG. 4 inasmuch as a 4×¼ inch metal plate 332 is welded to the top of a 2×6 inch tubular side beam 334. In fact, other than the anchor plate 324 being oriented inwardly, the structure at the base of each column member 330 is basically the same as that shown in FIG. 4.

Figure 29B:
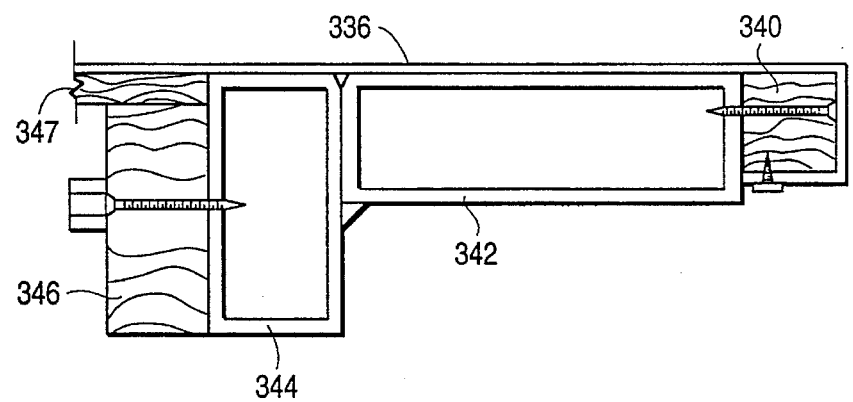
Figure 30:
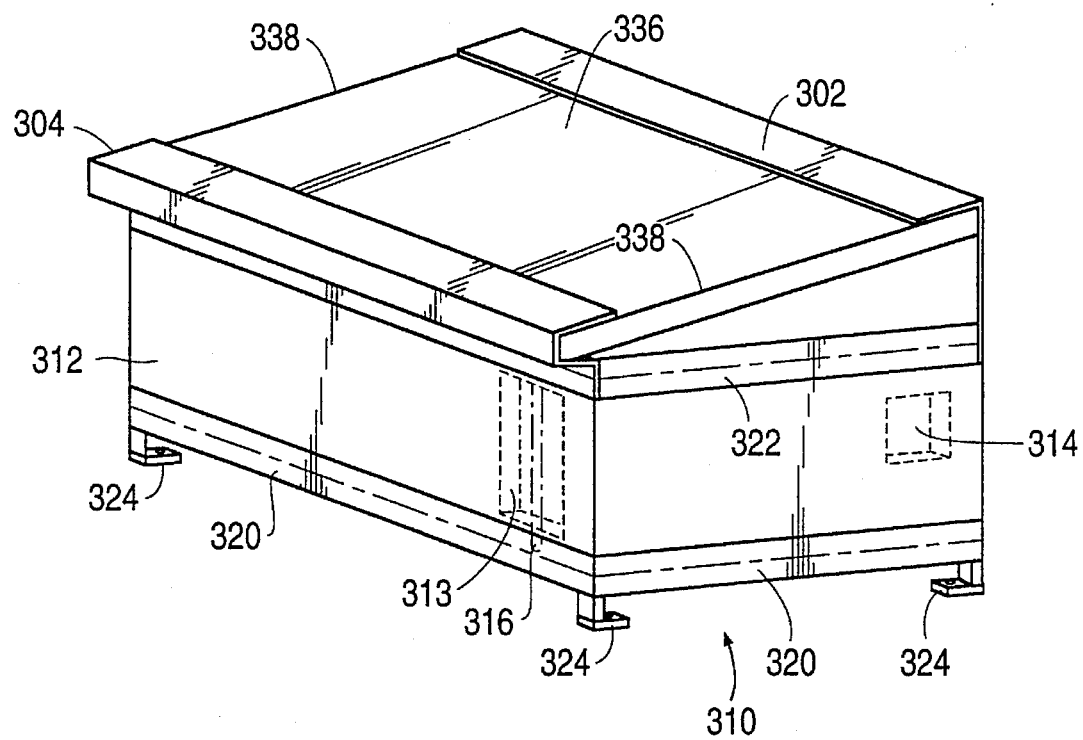
FIG. 30 shows a partially completed building according to the fourth embodiment of the present invention after the walls have been wrapped and reinforcing brackets are secured in place.

FIG. 29B shows the structure which characterizes the areas enclosed in the circle B. It should be noted however, that this drawing shows an arrangement wherein a membrane roofing material 336 has been disposed over the roof and has been secured in place. In the arrangement depicted in FIG. 29B in order to secure the membrane roofing material 336 along the inclined side edges 338 of the lean to roof a 2×2 inch wooden block 340 is screwed to the outer minor edge of a 2×4 inch piece of tubular steel 342 and used to act as a membrane clamp around which the edge of the membrane roofing material 336 can be wrapped and fastened. A piece of 2×4 inch metal tubing is welded to the other side of the 2×6 inch metal tubing 342 in the manner illustrated. These two metal tubes form the outboard angled roofing sections of the skeleton depicted in FIG. 26.

A piece of 2×4 timber 346 which forms part of the roof of the prefabricated wooden structure unit 326, is secured to the inner side wall of the tube 344 by screws. A piece of ½ inch plywood 347 which forms part of the roof is supported on the upper edge of the piece of timber 346 so as to be flush with the upper edge of the metal tubes 342, 344 and thus define a flat surface over which the membrane roofing material can be laid.

Figure 29C:
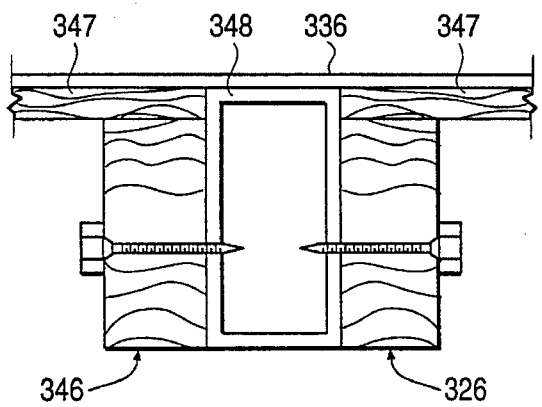

FIG. 29C shows a structure which results at one of the inboard angled roofing sections and which depicts two prefabricated wooden structure units 326 are secured to either side of the 2×4 inch metal tube. As the structure will be self-evident in light of the construction described in connection with FIG. 29B, further description will not be given.

Figure 29D:
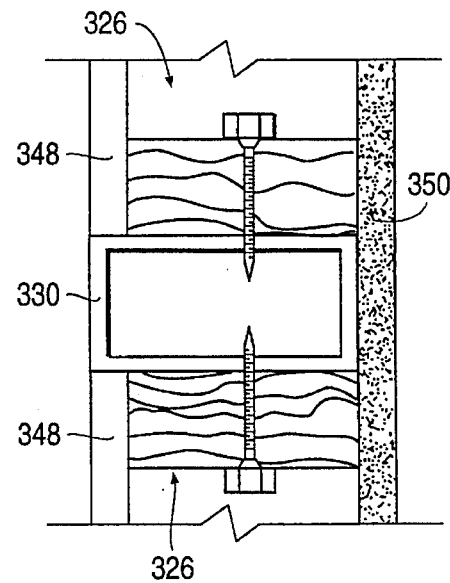
Figure 29E:
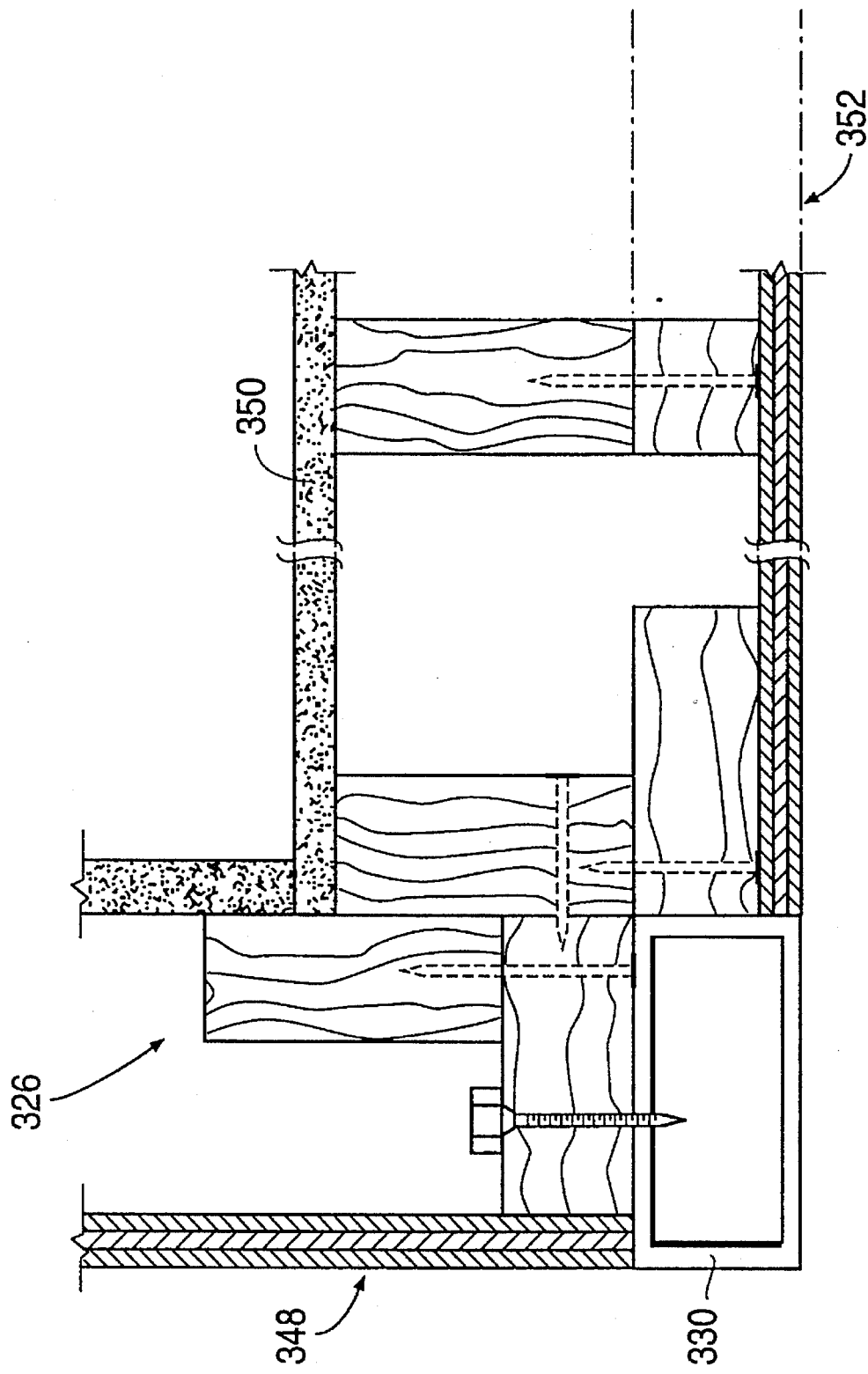

FIG. 29D shows the structure which results in the zone enclosed by circle D in FIG. 26. As will be appreciated, outside sheeting 348 is arranged to be set flush with the metal tube columns 330 while a drywall 350 has been disposed on the inner wall of both of the units 326. An additional end wall unit 352 is set into the 2 inch deep gap which remains after a prefabricated wooden structure unit has been secured in place. This additional end wall unit 352 consists of a timber frame on which plywood sheets are secured. As shown the thickness of the frame is just 2 inches and such that the outer surface of the plywood sheets lies flush with the sides of the 2×4 inch steel tubes which define the corner column members. The provision of the dry wall 350 and the outside sheeting 348 is believed to be self-explanatory.

Figure 31:
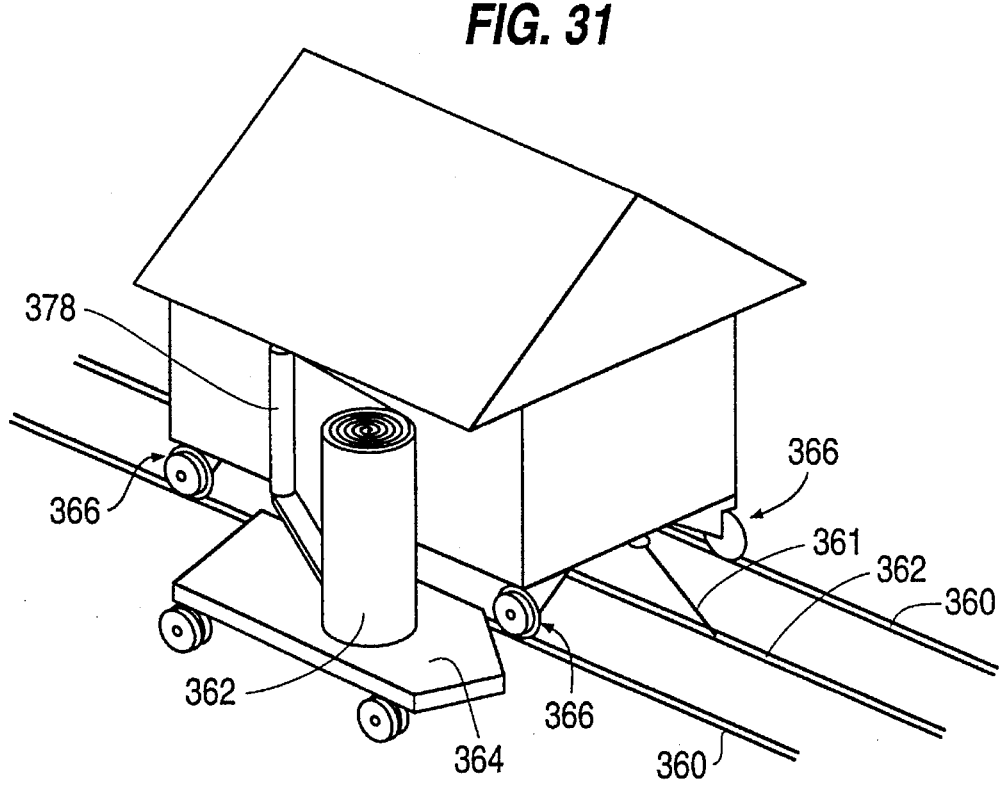
FIG. 31 is a perspective sketch showing a construction arrangement via which a building can be wrapped in accordance with a fifth embodiment of the present invention.
Figure 32:
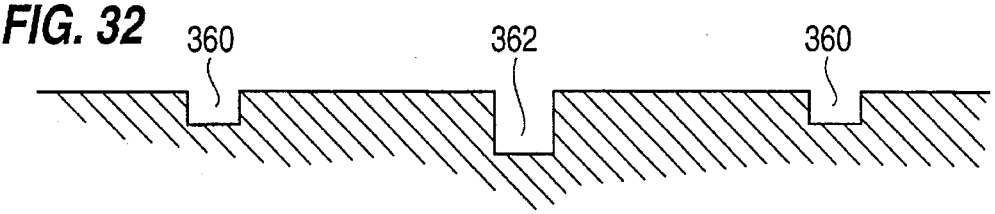
FIG. 32 is a sectional view showing a track arrangement which is used in the arrangement shown in FIG. 30.
Figure 33:
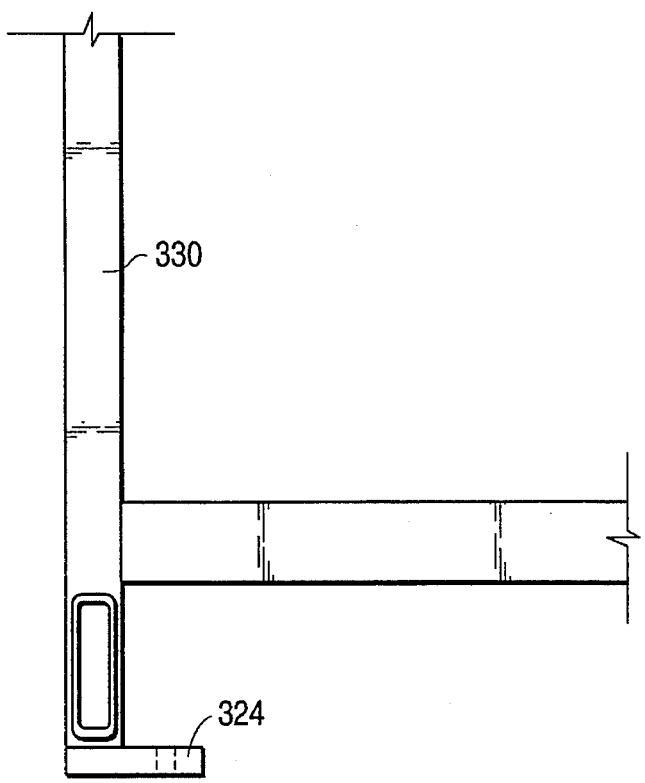
FIG. 33 is a elevational view showing the manner in which the anchor pads are arranged to extend inwardly in this embodiment.

FIG. 31 schematically represents a construction technique which is used to wrap the walls of the building with the single sheet of material. In order to facilitate production, each building unit is arranged to run along inverted rails 360 while a roll 362 of the wrapping material is supported on a wheeled vehicle 364 which can be driven around the building while applying the sheet to the wall surfaces of the building. In this fifth embodiment of the invention, use is made of the anchor plates 324 to secure the bogey units 366 to the building structure and thus render the buildings movable along the inverted rails 360. To move the building units along the inverted rails 360 it is possible to use a pull chain arrangement wherein a chain 361 which is attached to the building structure in the manner shown in FIG. 31, is arranged to be pulled along a pull chain track 362 by a suitable chain drive mechanism (not shown).

Figure 34:
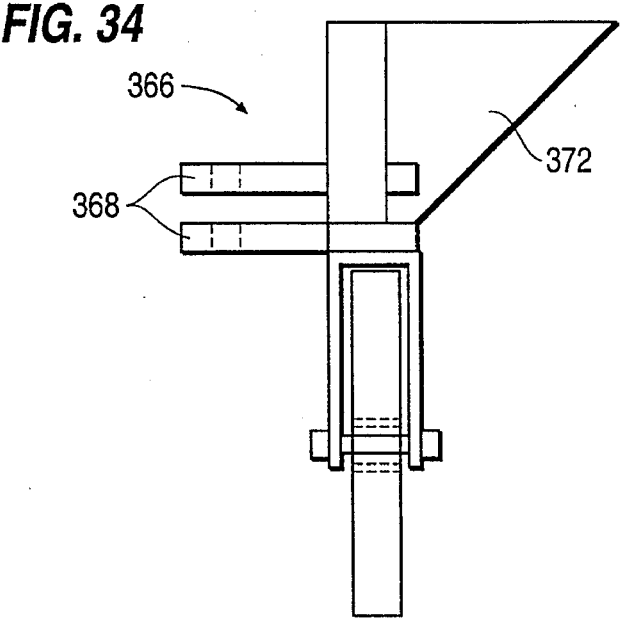
FIG. 34 is a front view showing a bogey unit which can be attached to the metal frame by way of the anchor pads and which is used to transport the structure along the track arrangement depicted in FIG. 30.
Figure 35:
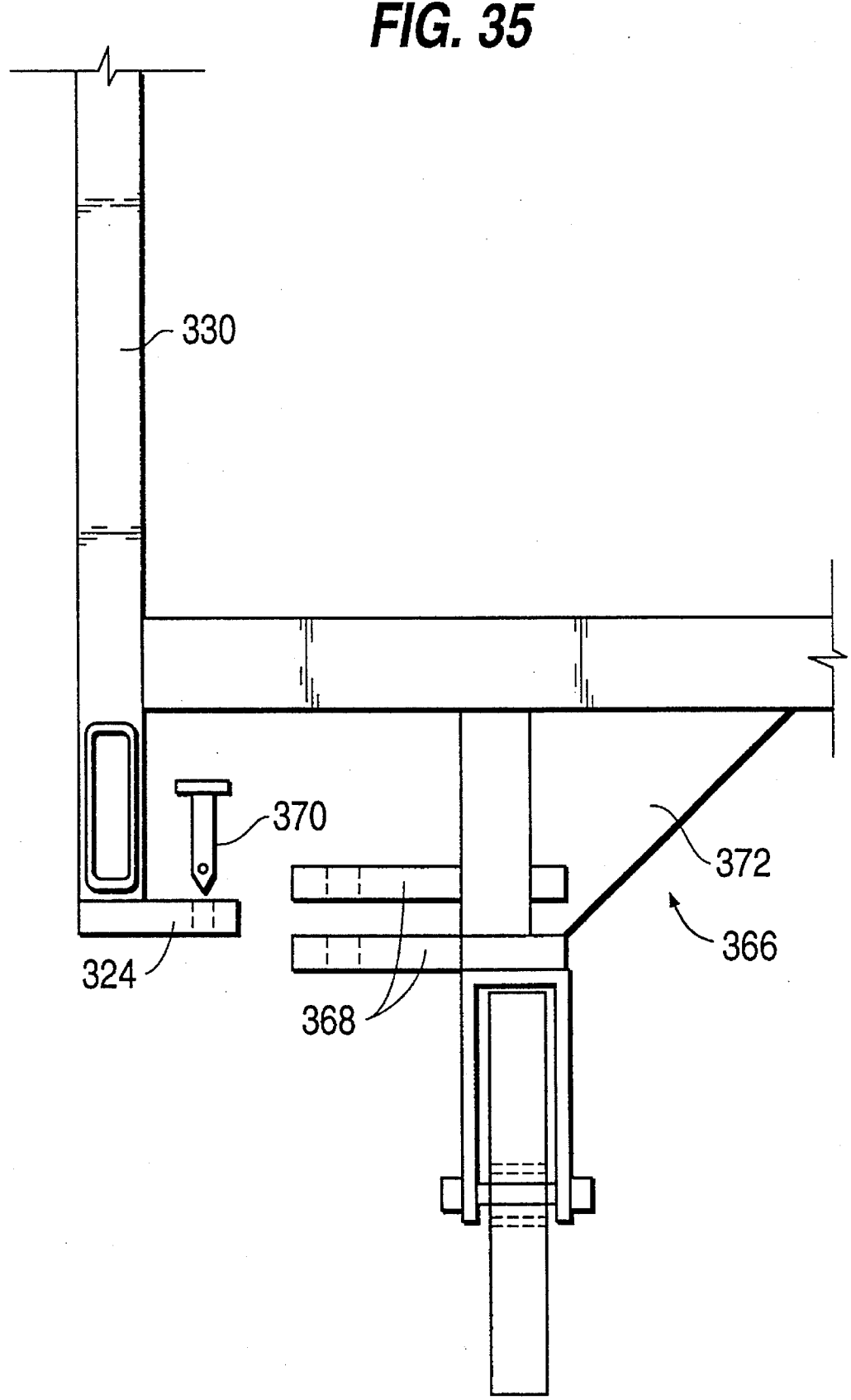
FIG. 35 is a front view illustrating the manner in which the bogey unit can be connected to the anchor pad by way of a connection pin.

FIG. 35 shows how a bogey unit 366 illustrated in FIG. 34 can be attached to the an anchor plate and used to render the building structure mobile. In this embodiment, the bogey is slid under the building while it is supported at a suitable height such as by hydraulic jacks or the like, slipped into position wherein parallel connection plates 368 sandwich the inwardly extending anchor plates 324 and then connected in place by a pin 370. Under these conditions, a supporting frame 372 engages a lower surface of the tubular steel skeleton. After the bogey units 366 are pinned in place, the building unit can be lowered onto a flat surface which is level with the bottom of the inverted rails or lowered directly into the inverted rails as is preferred. If required the wheels on the bogey units 366 can be arranged so that they can undergo a limited amount of rotation and thus allow the train carriage-like arrangement to negotiate curved pieces of track.

Figure 36:
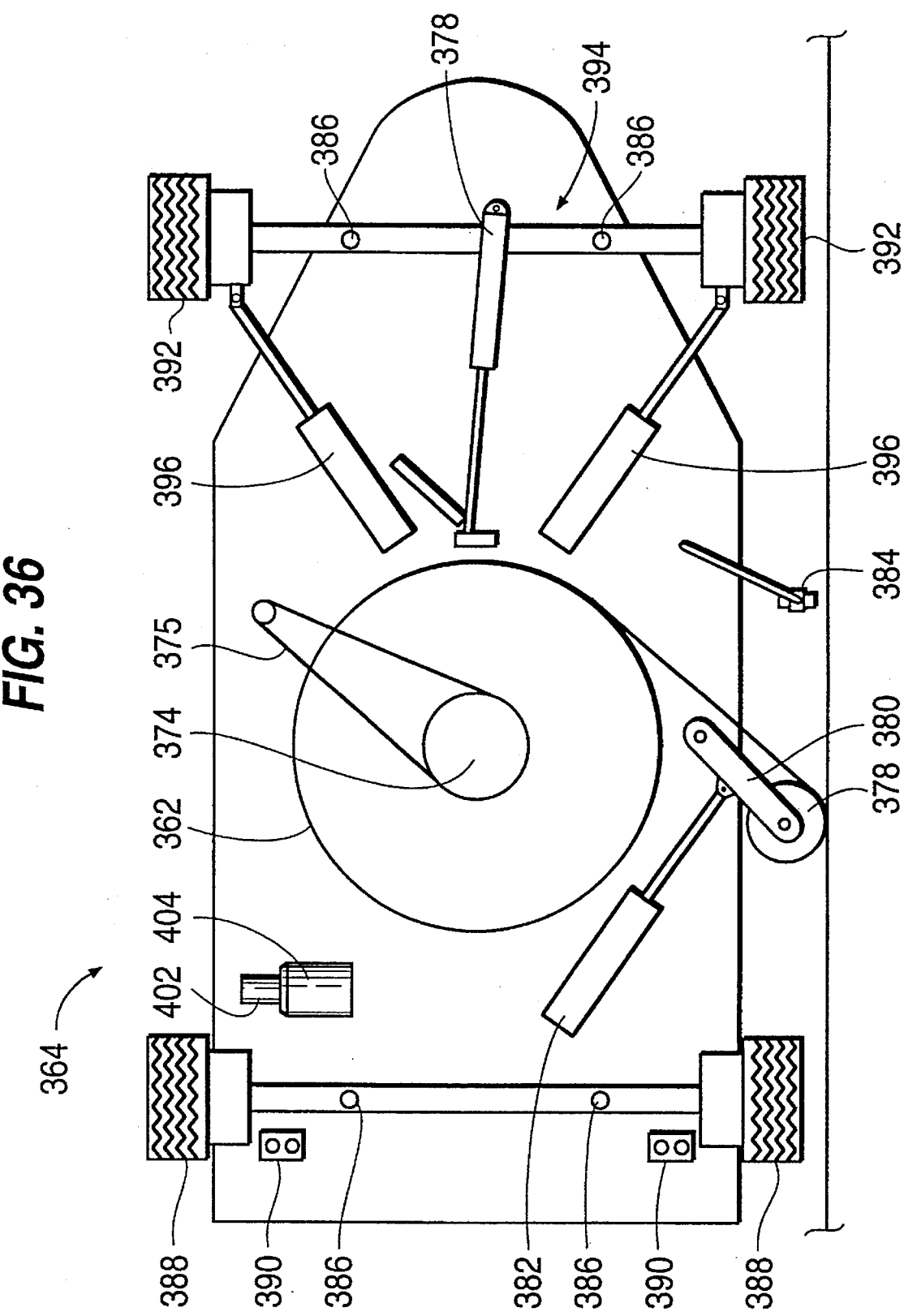
FIG. 36 is a schematic plan view of a vehicle which can used to wrap a metallic sheet about the house in the manner illustrated in FIG. 30.

FIG. 36 schematically shows an example of the wheeled vehicle 364 which can be used to move the roll 362 of wrapping material about the building. This arrangement is such that a roll of aluminum sheet is disposed on an inflatable spindle 374. The spindle 374 is connected by a drive belt 375 to a hydraulically powered tension control motor 376. A press roller 378 is mounted on the end of pivotal arm arrangement 380. A hydraulic servo cylinder 382 is operatively connected with the arm 380 and arranged to bias the roller 378 against the wall of the building with sufficient pressure as to cause the sheet of aluminum which is being drawn from the roll, to be pressed flat. A reciprocating spay gun arrangement 384 is arranged to spray a suitable amount of adhesive onto the surface of the house immediately upstream of the press roller 378 to permit the sheet of aluminum to be bonded in place.

The height of the vehicle 364 is controlled by height adjusting hydraulic cylinders 386 while the driving wheels 388 are operatively connected with hydraulic tram motors 390. The forward steering wheels 392 are mounted on an axle arrangement 394 and connected with hydraulic steering cylinders 396. A spring loaded hydraulic cylinder 398 is operatively connected with a coil brake 400. A hydraulic pump 402 which supplies hydraulic fluid under pressure is arranged to be driven by an electric motor 404. The hydraulically powered motors and cylinders are suitably connected with this source of hydraulic fluid under pressure through a suitable hydraulic conduit/valve control network (not shown).

It will be appreciated that while the roll of material has been disclosed in the fifth embodiment as being supported on a vehicle which can maneuver around the building, it is within the scope of the present invention to arrange for the building to move about the roll. For example, the building could be mounted on a turntable like arrangement and the roll of wrapping arranged to move reciprocally back and forth toward the rotating building to allow for the corners etc. The various other alternatives which are possible in order the achieve the wrapping process will suggest themselves to those skilled in the building art when equipped with the above disclosure. For example, the vehicle on which the roll is supported could be arranged to run along predetermined tracks which encircle a space sufficiently large to accommodate a building. The use of digital control and sensors for detecting position and the like could be used to partially or totally robotize some or all of the wrapping operations. Further, while aluminum sheet is used in the disclosed embodiments, the present invention is not specifically limited to the use of this material and plastic material such as Nylon® or the like type of high strength polymerbased materials are not excluded. The same sheet material as used for covering the roof may be used if so desired.

It should be noted that it possible to brick the embodiments of the present invention at any time after they are set in place without removing anything from the house. That is to say, it is possible to brick the walls of the houses constructed in accordance with any of the embodiments of the invention in a manner which renders them essentially indistinguishable from other totally conventional constructions.

Although the invention has been described with reference to limited number of different embodiments, it will be self-evident to one skilled in the art to which the present invention pertains, as to the number variations and modifications which can be made without departing from the scope of the invention which is limited only the appended claims.

What is claimed is:

1. A pre-assembled, relocatable building structure which can be transported in completed form and which can be set on foundation members, said building structure having a plurality of sides and a roof, comprising:

a metallic skeleton including a plurality of pairs of vertically extending column members, longitudinally extending side beam members and laterally extending cross beam members, said side beam and cross beam members being permanently connected to said column members at a level proximate the lower end thereof, said skeleton further including a plurality of angled portions, each of said angled portions being permanently connected to the upper ends of a pair of said column members, said metallic skeleton including at least one cell space defined between adjacent pairs of column members;

a prefabricated wooden housing unit having a floor, at least one wall and a roof, which is disposed in said cell space, said prefabricated wooden housing unit being effective to fill said cell space and have members located in immediate proximity to each of four column members and which can be fastened to said column members, said wall forming a part of a side of said building structure; and a single sheet of material which is wrapped about and fastened to the sides of said building structure, said single sheet covering all sides of said building structure, and having first and second ends which overlap to form a single vertically extending seam.

2. A pre-assembled, relocatable building structure as set forth in claim 1, further comprising:

a plurality of horizontally extending anchor pads which are each permanently secured to a bottom of a column member, each anchor pad being adapted for detachable connection to said foundation members, each of said anchor pads being formed with a hole through which a connection member which projects up from a foundation member can be passed.

3. A pre-assembled, relocatable building structure as set forth in claim 1, further comprising metal encapsulating bracket means associated with said wall and roof structures for enclosing edges of panels which form a part of said wooden housing unit thereof and for preventing direct contact of said edges with high velocity winds.

4. A pre-assembled, relocatable building structure as set forth in claim 1, further comprising a plurality of metal plates which are each permanently fixed to the top of a side beam, said metal plates supporting headers and the ends of floor joists which form part of a floor structure of said wooden housing unit.

5. A pre-assembled, relocatable building structure as set forth in claim 1, wherein said vertical columns, said side beams and said laterally extending cross beam members are formed of a hollow metallic tubing.

6. A pre-assembled, relocatable building structure as set forth in claim 5, wherein said hollow metallic tubing has an essentially rectangular cross-section.

7. A pre-assembled, relocatable building structure as set forth in claim 3, further comprising an elastomeric membrane sheet type roofing material disposed over the top of the roof of said building structure, said elastomeric membrane being wrapped over the metal encapsulating means associated with the roof and secured to a lower side of the metal encapsulating means.

8. A pre-assembled, relocatable building structure as set forth in claim 7, wherein said metal encapsulating bracket means comprises a first bracket which is disposed along an eave portion of said roof structure.

9. A pre-assembled, relocatable building structure as set forth in claim 7, wherein said metal encapsulating bracket means comprises a second bracket which is disposed over the top of an angled portion in a manner which encloses a free edge portion of said elastomeric membrane sheet type roofing material.

10. A pre-assembled, relocatable building structure as set forth in claim 3, wherein said metal encapsulating bracket means comprises a third bracket which is fastened to the side of a side beam member in a manner which defines a channel into which the edge of a side wall sheet can be inserted.

11. A pre-assembled, relocatable building structure as set forth in claim 3, wherein said metal encapsulating means comprises a fourth bracket which is secured to the top of a cross beam, said fourth bracket forming a channel into which an end wall sheet can be inserted.

12. A pre-assembled, relocatable building structure as set forth in claim 3, wherein said metal encapsulating means comprises a fifth elongate essentially inverted V-shaped bracket which is disposed along a ridge of the roof and which encloses and is connected to sheets which form part of said roof structure.

13. A pre-assembled, relocatable building structure as set forth in claim 1, further comprising:

an elongate bolt which is disposed through a side beam;

a wooden block which is disposed about said bolt and located proximate the side beam through which the bolt is disposed; and said elongate bolt being adapted for burial in a concrete slab which is formed immediately beside the building structure.

14. A pre-assembled, relocatable building structure as set forth in claim 1, further comprising:

transporting means for supporting said building structure and for, during relocation, moving said building structure from a first site to a second site, said transport means including:

a plurality of metal beams which can be disposed beneath said building structure at locations inboard of said column members;

a wheel carriage which can be detachably connected the rear ends of said metal beams; and connector means for connecting the forward ends of said metal beams to a prime mover.

15. A pre-assembled, relocatable building structure as set forth in claim 14, wherein said wheeled carriage includes a first hydraulic servo means for selectively lifting and lowering the rear ends of said metal beams.

16. A pre-assembled, relocatable building structure as set forth in claim 14, wherein said connector means further comprises second hydraulic servo means for selectively lifting and lowering the forward ends of said metal beams.

17. A pre-assembled, relocatable building structure as set forth in claim 14, further comprising safety pin means for locking the rear ends of said metal beams in a predetermined position so that irrespective of a malfunction in said first hydraulic servo means, the position of the rear ends of said metal beams will not alter.

18. A pre-assembled relocatable building structure as set forth in claim 1, further comprising:
- a wheeled carriage for supporting a first end of said building structure, said wheeled carriage having a first pair of tongues which can be inserted into first end portions of said longitudinally extending side beam members; and
- connection means for supporting a second end of said building structure, said connection means having a second pair of tongues which can be inserted into second end portions of longitudinally extending side beam members.

19. A pre-assembled, relocatable building structure which can be transported in completed form and which can be set on pre-prepared foundation members, said building structure having a plurality of sides and a roof, comprising:
- a metallic skeleton including a plurality of pairs of vertically extending column members, longitudinally extending side beam members and laterally extending cross beam members, said side beam and cross beam members being permanently connected to said column members at a level proximate the lower end thereof, said skeleton further including a plurality of angled portions, each of said angled portions being permanently connected to the upper ends of a pair of said column members, said metallic skeleton including at least one cell space defined between adjacent pairs of column members;
- at least one prefabricated wooden housing unit having a floor, at least one wall and a roof, which is disposed in said cell space, each wooden housing structure being effective to fill a cell space and have members located in immediate proximity to each of four column members and which can be fastened to said column members, said wall forming a part of a side of said building structure; and
- means for securing said vertically extending column members of said metallic skeleton to said pre-prepared foundation members comprising a plurality of horizontally extending anchor pads which are each permanently secured to a bottom of a column member, each anchor pad being adapted for detachable connection to said pre-prepared foundation members, each of said anchor pads being formed with a hole through which a connection member which projects up from a pre-prepared foundation member can be passed.

20. A pre-assembled, relocatable building structure as set forth in claim 19, further comprising: a single sheet of material which is wrapped about and fastened to the sides of said building structure, said single sheet covering all sides of said building structure, and having first and second ends which overlap to form a single vertically extending seam.

21. A pre-assembled, relocatable building structure which can be transported in completed form and which can be set on foundation members, comprising:
- a roof;
- a wall;
- a single sheet of material having first and second ends, said sheet being wrapped about said building structure so as to completely cover said wall, said sheet being fastened to said wall, the first and second ends of said sheet overlapping to define a single joint where said sheet can be effected by pneumatic pressures generated by high velocity winds.

22. A method of constructing a house comprising the steps of:
- wrapping walls of the house with a single sheet of material;
- overlapping the ends of the sheet;
- fastening the overlapped ends to at least one another; and
- selectively cutting and folding in portions of said sheet into door and window openings.

23. A method of constructing a house as set forth in claim 22, wherein said single sheet is metallic and wherein said wrapping operation is carried out horizontally.

24. A method of constructing a house as set forth in claim 22, wherein said single sheet is made of aluminum.

25. A method of constructing a house comprising the steps of:
- forming a metallic skeleton having a plurality of pairs of vertically extending column members, longitudinally extending side beam members and laterally extending cross beam members, said side beam and cross beam members being permanently connected to said column members at a level proximate the lower end thereof, said skeleton further including a plurality of angled portions, each of said angled portions being permanently connected to the upper ends of a pair of said column members, said metallic skeleton including a cell space defined between adjacent pairs of column members;
- forming a prefabricated wooden housing unit having a floor, at least one wall and a roof;
- disposing said prefabricated wooden housing unit in the cell space, said wooden housing structure being effective to fill the cell space and have members located in immediate proximity to each of four column members and which can be fastened to said column members, said wall forming a part of a side of said building structure; and
- welding brackets to said metallic skeleton to trap said at least one prefabricated wooden housing unit in said metallic skeleton.

26. A method of constructing a house as set forth in claim 25, further comprising the step of welding anchor pads, which enable the house to be detachably secured to pre-prepared foundations, to the lower ends of said column members.

27. A method of constructing a house as set forth in claim 26, further comprising the steps of:
- mounting wheeled bogeys on said anchor pads; and
- transporting the house along a predetermined path using said wheel bogeys.

28. A method of constructing a house as set forth in claim 25, further comprising the step of wrapping the walls of the house with a single sheet of material.

29. A method of constructing a house as set forth in claim 28, wherein said step of wrapping the walls of the house includes the steps of:

supporting a roll of the sheet of material on a wheeled vehicle which can be moved around the house;

paying out the sheet from the roll as the vehicle moves around the house;

pressing the sheet against the walls of the house and fastening the sheet against the walls of the house; and cutting off the sheet and pressing the ends of the sheet which has been wrapped around the house on top of each other to form a seam.

30. A method of constructing a house as set forth in claim 29, further comprising the steps of:

selectively cutting through portions of said sheet and folding portions of the sheet back into door and window openings.

* * * * *